United States Patent
Koshimizu et al.

(10) Patent No.: US 7,265,864 B2
(45) Date of Patent: Sep. 4, 2007

(54) OPTICAL WRITE APPARATUS AND OPTICAL WRITE METHOD

(75) Inventors: Minoru Koshimizu, Ebina (JP); Daisuke Tsuda, Ebina (JP); Yasunori Saito, Ebina (JP); Tsunemasa Mita, Ebina (JP); Masaaki Araki, Ebina (JP); Naoki Hiji, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1124 days.

(21) Appl. No.: 10/081,182

(22) Filed: Feb. 25, 2002

(65) Prior Publication Data

US 2002/0118400 A1    Aug. 29, 2002

(30) Foreign Application Priority Data

Feb. 28, 2001 (JP) ............................. 2001-054131
Jun. 19, 2001 (JP) ............................. 2001-185304
Jul. 30, 2001 (JP) ............................. 2001-230060

(51) Int. Cl.
*H04N 1/40* (2006.01)
(52) U.S. Cl. ..................................... 358/1.16; 358/296
(58) Field of Classification Search ................. 358/1.9, 358/2.1, 1.15–1.18, 296, 302; 349/19–20, 349/24–30
See application file for complete search history.

(56) References Cited

U.S. PATENT DOCUMENTS

| 4,240,712 | A | * | 12/1980 | Thirant | ......................... 349/20 |
| 5,329,390 | A | * | 7/1994 | Fujiwara et al. | .............. 349/27 |
| 5,623,352 | A | * | 4/1997 | Kato et al. | ..................... 349/17 |
| 6,686,017 | B2 | * | 2/2004 | Ogawa | ....................... 428/64.1 |
| 6,982,833 | B2 | * | 1/2006 | Nemoto | ...................... 359/626 |
| 2002/0119279 | A1 | * | 8/2002 | Ogawa | ....................... 428/64.4 |

FOREIGN PATENT DOCUMENTS

JP    A 2000-111942    4/2000
JP    A 2001-92016    4/2001

OTHER PUBLICATIONS

Arisawa et al., "Electronic Paper using Cholesteric Liquid Crystal—Photo Addressing with Organic Photo Conductor—", Japan Hardcopy, pp. 89-92, 2000.
Kamiyama et al., "Research for Elgraphy", Japan Hardcopy, p. 25, 1996.
Yoshida et al., "Reflective Display with Photoconductive Layer and a Bistable, Reflective Cholesteric Mixture", SID Application Digest, pp. 59-62, 1996.
Japanese Office Action No. 2001-230060, Sep. 12, 2006.

* cited by examiner

*Primary Examiner*—Thomas D. Lee
*Assistant Examiner*—Stephen Brinich
(74) *Attorney, Agent, or Firm*—Oliff & Berridge, PLC

(57) ABSTRACT

An optical write apparatus has an image display screen 102 for displaying an image and role switch section 105 for switching the image display screen 102 between a role in displaying an image for observation and that in writing an image onto an image record medium 10 onto which an image is written upon application of light for representing the image.

5 Claims, 29 Drawing Sheets

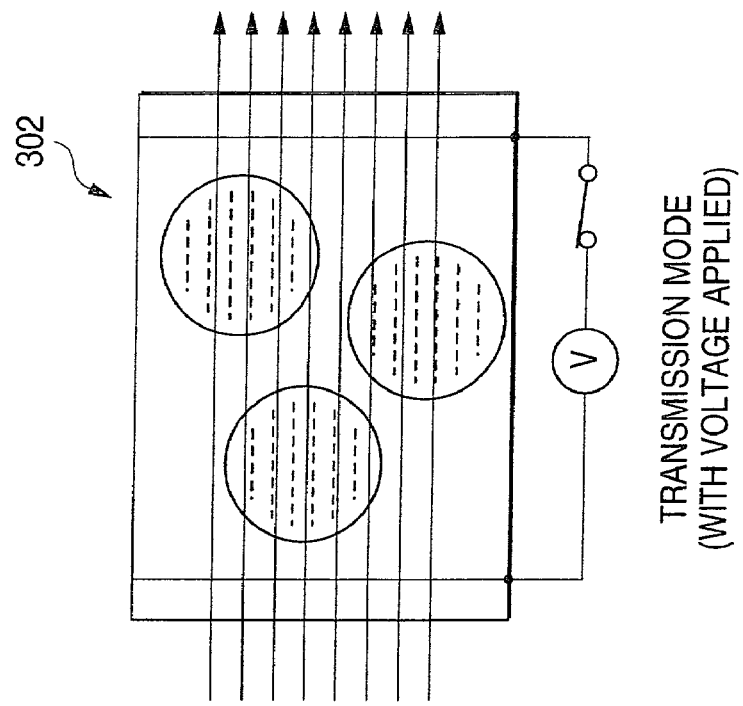
FIG. 17(b) TRANSMISSION MODE (WITH VOLTAGE APPLIED)
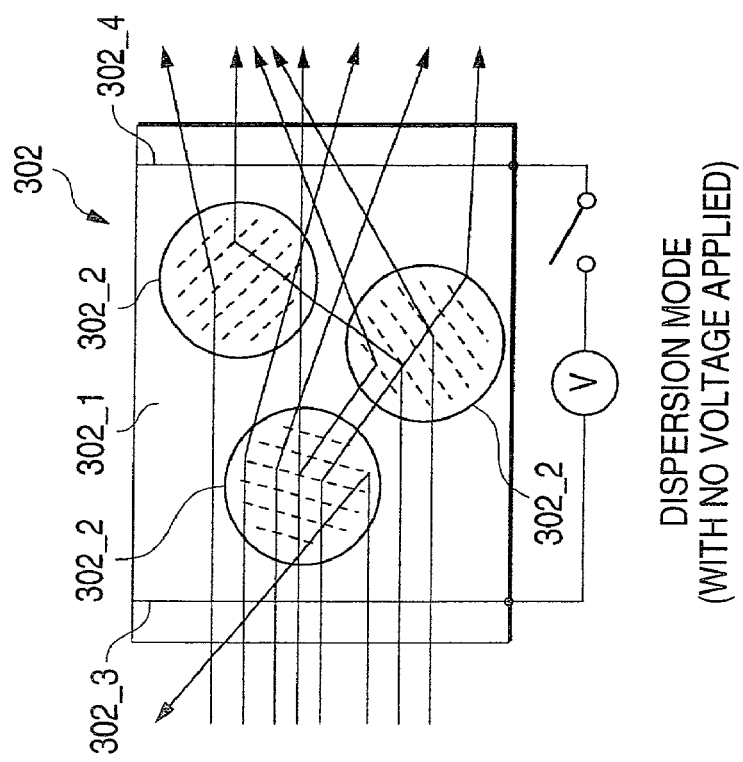
FIG. 17(a) DISPERSION MODE (WITH NO VOLTAGE APPLIED)

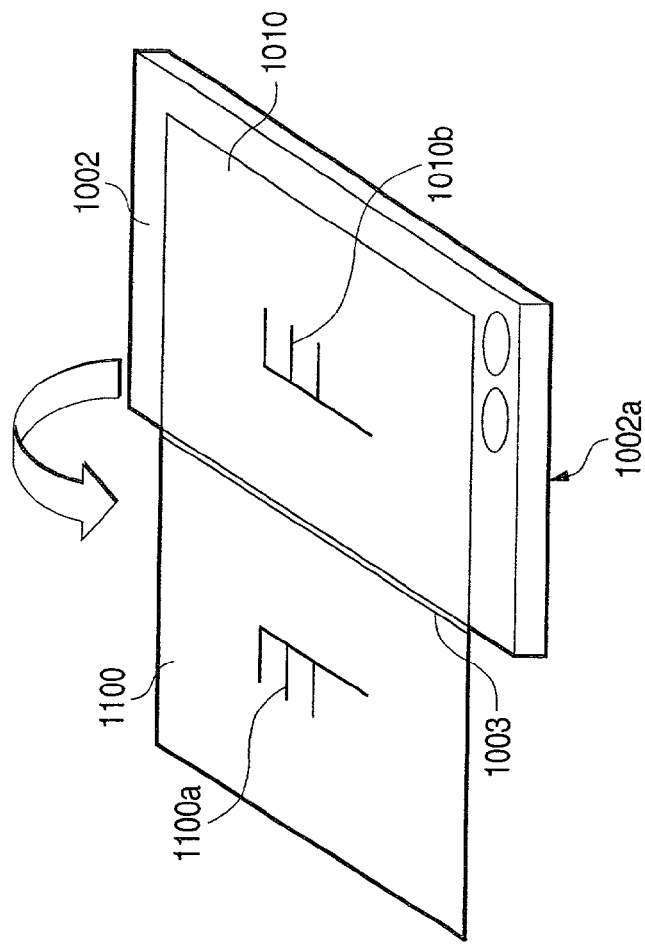
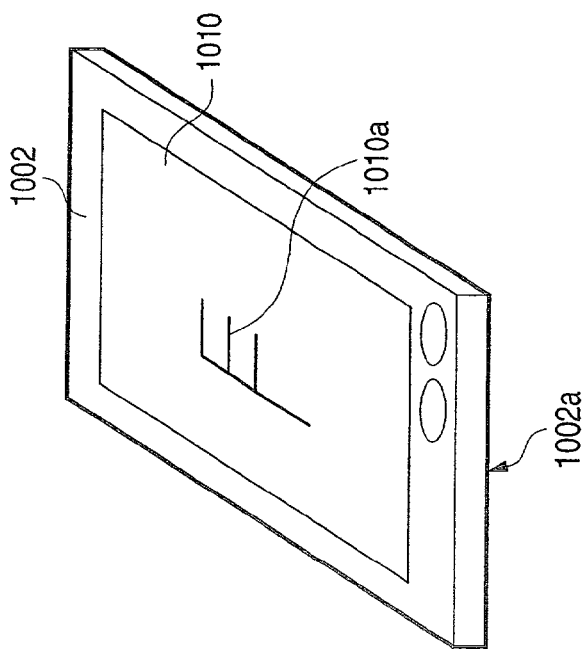

OPTICAL WRITE APPARATUS AND OPTICAL WRITE METHOD

BACKGROUND OF THE INVENTION

1. Field of the Invention

This invention relates to an optical write apparatus and optical write method for writing an image displayed on an image display screen onto an image record medium onto which an image is written upon application of light for representing the image.

2. Description of the Related Art

With the recent rapid advance and widespread use of computers, relevant machines, and the information communication environment with Internet mobile communications as the nucleus, the effects of information digitalization are widely recognized and IT revolution is taking place. Digital information is used exceeding the time and space on various scenes of business, public, and privacy and our life styles are largely affected.

As information digitization is advanced, the total distributed information amount and digitalized information ratio rapidly rise and the variety of content is increased. As the information environment is improved, the productivity is enhanced; on the other hand, the efficiency of the cycle of selecting significant information from among enormous information pieces, understanding the information, and determining and acting according to the information is also demanded more than ever before. In such environment change, the development of electronic displays indispensable as an interface for connecting digital data and human beings was the base of constructing the information environment, needless to say, and the role of the electronic display grows more than ever before.

On the other hand, paper media also continue to serve as information display media beside displays. It is expected that if paperless society is placed in an advanced state with the development of information electronization, paper consumption is decreased; in fact, however, there is a trend toward an increase in the consumption amount of information paper. The following causes are possible: Large change in the practice of distributing information in paper form does not occur; occasions of printout are also increased in association with an increase in distributed electronized information; print is easy to perform and transient information and documents being edited are printed readily (output increase of transient documents); a large number of persons find it inconvenient to conduct a sequence of jobs only with a display without using paper; the whole productivity is improved because of information electronization; and the like. If paper consumption also increases worldwide in association with the digital information distribution amount increased more and more in the future, an important social issue is also caused to occur in the sense of conservation of the global environment, and it is also necessary to consider dealing with the issue.

Considering the described background, an image record medium called digital paper or electronic paper having the merits of both an electronic display and paper is proposed as one form of information display media demanded in the future information-oriented society. Clear definition about the technical field does not exist; for example, to attach importance to the form and characteristics like paper and add digital functions containing rewrite, (1) (microcapsule) electrophoretic technique, (2) two-color particle rotation control technique, (3) ferroelectric liquid crystal technique, (4) guest host liquid crystal technique, (5) toner display technique, (6) cholesteric material technique, and the like are proposed as display media technologies, and research and development containing bringing some to the commercial stage is underway.

Every technique mentioned above is reflection type display and has a memory property of being capable of holding an image without continuing to apply energy such as voltage once the image is written, and can be made flexible. The techniques are common in orientation at this point in time, but an ideal technical candidate comprising all of high image quality as much as print, moving image suitability, highly reliable memory property, flexibility like paper, color suitability, low price, and the like does not appear and each of the techniques has its merits and demerits.

The characteristics required as image record media include stable rewritability, resistance to mechanical load, additional writability, and the like in addition to the above-mentioned items; among them, a function of rendering information viewed on a display the form like a sheet supported by hand instantaneously can be named as an important function that cannot be provided simply by properly using a display and printout paper. Using a plurality of sheets, the flexibility of listing and spatial placement provided by paper can be supported and these characteristics are provided, whereby interference with thinking and debating and fatigue and wasted paper consumption can be prevented and intellectual work is helped. At this time, if the price per sheet of electronic paper is high, the function of helping the intellectual work is impaired because it becomes difficult to have a plurality of sheets, readiness to handle paper is impaired, the distribution property like paper is impaired, etc. Therefore, image record media that can provide the above-described function at a low price are demanded.

To provide the above-described function, namely, the function of rendering information viewed on a display the form like a sheet supported by hand instantaneously, the following two ways are possible: a) using a sheet-like display comprising display and drive elements placed integrally without any change and b) using a drive that can be separated from a display sheet to write and separate the sheet.

As for a), it is indispensable to provide one drive per screen, resulting in an increase in the cost per sheet. To output a high-resolution image required for practical document read, etc., a drive circuit capable of accomplishing high-definition and high-speed driving needs to be formed on a sheet-like substrate, and the practical level is not reached in the present technology. If the technique is accomplished with the development of the thin-film transistor formation technology on a film substrate, it is difficult to provide an environment in which a plurality of sheets are handled readily because of an increase in costs.

As for b), a display sheet and a drive are separated from each other, whereby an increase in the cost per sheet can be prevented and practical section capable of supporting use of a plurality of sheets is provided. However, if a technique in which the color (reflectivity) change speed of each display element is low or a sequential write technique with one-dimensional elements in write operation is adopted, it takes time in output and instantaneous rewrite cannot be supported. Therefore, instantaneous write with two-dimensional drive elements becomes necessary and further to separate the display sheet and the drive rapidly, a connection device such as a connector needs to be extremely simple. As a specific method for providing such a function, an optical write image record medium using the candidate technology in (6) described above and a photoconductor in combination is proposed in JP-A-2000-111942, Nihon Gazou Gakkai Japan Hardcopy 2000 Ronbunshuu p 89-92. According to the technique, a wiring pattern in pixel units is not required for a medium and if applying a predetermined voltage to transparent electrodes on a pair of substrates and applying a two-dimensional light pattern from the outside of the medium are performed at the same time, an image can be formed instantaneously. The medium and the voltage applying unit are connected only at two points as many as the number of the electrodes and can be attached and detached very easily. To use the technology to actually apply a two-dimensional light pattern, for example, a liquid crystal panel or a projector can be used.

To display information of a document or a picture prepared with a personal computer, etc., on an image display such as a CRT or a liquid crystal display and convert the displayed information into media (hardcopy media) to enable the user to view the displayed information with several media supported by hand, it is common practice to print out on paper. In addition, information displayed on a screen is photographed by an instant camera, etc., and is converted into a film. In any case, it requires a predetermined time and thus there is a problem of interrupting thinking and lowering the efficiency of creative work.

In recent years, the expectation with respect to new hardcopy media replacing paper has been raised from environmental problems of the conservation of forest resources and waste treatment. From such a background, the research of new image record media of optical write record media described above is conducted heavily. For example, an image record medium comprising a display layer made of a cholesteric material and an optical switching layer made of amorphous silicon is known as described in H. Yoshida, T. Takizawa et al. "Reflective Display with Photoconductive Layer and a Bistable, Reflective Cholesteric Mixture" SID' 96 APPLICATIONS DIGEST p 59-p 62, and an image input system comprising each liquid crystal element having a memory property and an organic photoconductor deposited on each other is known as described in Japan Hardcopy' 96 Fall Meeting p 25.

usually, with the image record media of the optical write record media, while a predetermined voltage is applied to an optical switching layer, the impedance of the optical switching layer is changed based on the received light amount and the voltage applied to a display layer is controlled, whereby the display layer is driven for displaying an image.

As display materials used for the display layer of such an image record medium, liquid crystal materials such as nematic liquid crystal, twist nematic liquid crystal, supertwist liquid crystal, and smectic liquid crystal, surface stabilization ferroelectric liquid crystal, polymer-scattered liquid crystal comprising liquid crystal material scattered in polymer, capsuled liquid crystal comprising capsuled liquid crystal material are known in addition to the cholesteric material. Among them, to use a display material having a memory property, electric power is not required for holding the record display state, so that after image information is recorded and displayed, the image record medium can be separated from the writer and can be carried. As such display materials having a memory property, cholesteric material, ferroelectric liquid crystal, polymer-scattered liquid crystal, capsuled liquid crystal, and the like are available.

A display screen of a CRT or a liquid crystal display can be instantaneously recorded on (transferred onto) the image record medium using a cholesteric material. As compared with printout to paper or photographing with an instant camera, etc., the time in preparing a hardcopy may be shorter and interrupting of thinking is lessened and lowering the efficiency of creative work is prevented. The environmental problems of the conservation of forest resources and waste treatment can also be solved.

An information terminal (called information kiosk terminal) being installed in a public installation, a shopping mall, etc., becomes widespread. It has an image display screen displaying an image and a touch panel and the user touches directly a menu button of the touch panel, whereby he or she can view various pieces of information on the floors, for example, on the image display screen. With the information kiosk terminal, the user selects information out of an information selection screen of a menu by performing direct or indirect instruction operation on an operation screen and visually checks the selected and displayed information and then memorizes the result or takes notes or if a printer is contained, prints out on paper and carries the paper. If the information amount is small, the information is easy to memorize; however, as the information amount increases, there is a problem of taking time and labor writing the information in longhand. If it is possible to print out on paper, the print wait time on paper is long, the person unfamiliar with computer operation is hard to know how to operate the machine for printing out the display screen information, and paper resources are wasted for temporary use. Then, the image display screen of the information kiosk terminal is instantaneously written onto the image record medium using a cholesteric material described above, whereby the above-mentioned problem can be solved.

To apply a two-dimensional light pattern according to the technique proposed in JP-A-2000-111942, Nihon Gazou Gakkai Japan Hardcopy 2000 Ronbunshuu p 89-92, it is important to form or project a clear light pattern on a photoconductive layer of the image record medium during writing onto the image record medium regardless of the method using a liquid crystal panel or a projector. As an actual procedure for instantaneously writing an image onto the image record medium, while the user visually checks the image displayed on the liquid crystal panel or the projector and switches the image, etc., he or she instantaneously makes a screen copy onto the image record medium as required.

Generally, to visually display an image, light from the top of the screen (the top of the liquid crystal panel or the top of the projector display panel) needs to have a constant dispersion property and enable the user to recognize the image over a given viewing angle. On the other hand, to write an image onto the image record medium, a light pencil having a high resolution to apply collimated light rather than dispersion property needs to be applied onto the surface of the photoconductive layer. That is, when an image is visually checked and when an image is written onto the image record medium, optically different characteristics are required. Usually, the liquid crystal display uses a backlight of a diffused light source so as to enhance viewability and the projector uses an enlargement optical system to project the optical pattern of an image on a dispersive display panel for creating a dispersive image. With both the machines, to provide the optical pattern to view, the image which becomes finally dispersive is created. To use an image record medium write apparatus and a separate display in combination, the optical function may be separated, but two two-dimensional optical pattern production panels become necessary, resulting in an increase in costs and upsizing. The sense of copying only the favorite part of the viewed portion intact onto the image record medium is lost.

FIG. 1 is a conceptual drawing of the basic configuration and write of an optical write image record medium, FIG. 2 is a conceptual drawing for using a liquid crystal write apparatus, and FIG. 3 is a conceptual drawing for using a projector.

FIG. 1 shows the basic configuration of the image record medium and the write light application direction. The configuration is proposed in Nihon Gazou Gakkai Japan Hardcopy 2000 Ronbunshuu p 89-92 mentioned above. An image record medium 10 of the image record medium comprises a display layer 13 of cholesteric material and a photoconductor layer (organic photoconductor layer) 15 deposited on each other via a light absorption layer 14 between paired substrates 11 and 17 containing transparent solid electrodes 12 and 16. To make possible AC driving of liquid crystal, charge generation layers 151 and 153 are placed above and below a charge transport layer 152 as the photoconductor layer 15 so that a symmetrical carrier move can be made. To write, write light for representing an image based on a two-dimensional strength distribution is applied to the photoconductor layer 15 and a constant pulse voltage is applied between the electrodes 12 and 16. Then, in the portion to which strong light is applied, the impedance of the photoconductor layer 15 is lowered by optical pumping under an electric field and the partial pressure onto the display layer 13 is increased. If a proper pulse voltage considering the threshold value of the cholesteric material display layer 13 is applied, switching is performed between a focal conic phase (transparent) and a planar phase (selective reflection color) in response to the applied light amount in the cholesteric material. A two-dimensional dimmer element is used with the write apparatus, whereby an image can be instantaneously transferred to the image record medium upon batched light exposure.

FIG. 2 shows a related art example wherein a liquid crystal panel 20 is used as a write apparatus. With the write apparatus, a light pattern is applied to the image record medium 10 based on whether or not backlight passes through the portion of a liquid crystal layer 21 formed with the light pattern like an image. At this time, a write pulse voltage from a pulse generator 30 is given to the image record medium 10.

To suppress the light dispersion component from the backlight, an LED having directivity can be used as the backlight. In this case, however, even if the image record medium is not placed, light output from the panel has high directivity, of course; the write apparatus is not fitted for that also serving as a display directly viewing the light.

FIG. 3 shows an application example wherein a projector 40 is used as a write apparatus. A light pattern from the projector formed with the light pattern like an image is applied intact to the photoconductive layer of the image record medium 10. If the image record medium is not placed, the write light pattern cannot be recognized as an image unless it strikes some object and is dispersed.

In both examples in FIGS. 2 and 3, the image record medium is placed and write light is applied from the rear of the display face. The display output by the liquid crystal panel or the projector cannot directly be observed from the display face (the surface of the image record medium (top face in FIG. 1)) in the presence of the light absorption layer (black) 14 in the image record medium (see FIG. 1). After the rewrite operation is performed, display is produced on the image record medium. Therefore, the configuration of this portion can deal with only typical rewrite operation such as page turning and image change cannot be recognized under circumstances where input frequently changes, and thus a separate display becomes necessary.

The image record medium requires optimum drive signal for the liquid crystal layer to write and screen display. However, write onto the image record medium is performed in the state of image display to view and thus is not always performed in the state fitted for the write condition; this is a problem. It may be difficult to provide an image suited for viewing with respect to the finally provided gradation representation, color, etc., of the image record medium because of the characteristic difference between the image record medium and the image write apparatus. Further, the display mode of the size, font, etc., of the image displayed on the screen of a CRT or a liquid crystal display may be unfitted for the image record medium picked up for viewing. It is difficult to deal with various image record media developed one after another based only on the characteristics of the image write apparatus and drive signal. Further, with the image record medium of double-page spread type, if the display screen of an image display is simply transferred, there is also the disadvantage for viewing that the left and right or the top and bottom are reversed.

Further, to instantaneously write the image display screen of an information kiosk terminal onto an image record medium, the problems of taking time and labor writing the information in longhand, the print wait time on paper, and unfamiliarity with computer operation are solved, but information provided in the recent information kiosk terminal may be used not only in the installation in which the information kiosk terminal is placed, but also in various facilities; information kiosk terminals appropriate for such a case are demanded.

It is therefore an object of the invention to provide an optical write apparatus and an optical write method for making it possible to satisfy the demand for the optically different characteristics of light dispersion in visual observation of an image and light transmission in writing an image onto an image record medium and enhance the display quality of the image written onto the image record medium.

SUMMARY OF THE INVENTION

To the end, according to the invention, there is provided an optical write apparatus comprising:

an image display screen for displaying an image; and a role switch section for switching the image display screen between a role in displaying an image for observation and a role in writing an image onto an image record medium onto which an image is written upon application of light for representing the image.

Preferably, there is provided the optical write apparatus in which the role switch section switches the image display screen between the roles by switching the optical characteristic of the image on the image display screen into different optical characteristic.

Preferably, the optical write apparatus further comprises a dimmer layer switched reversibly between light dispersion mode and light transmission mode in response to a control signal, in which the role switch section switches the optical characteristic of the image on the image display screen by switching the dimmer layer between the light dispersion mode and light transmission modes.

Preferably, the optical write apparatus further comprises a display panel of transmission type for generating an optical pattern responsive to an image signal, in which the dimmer layer is disposed on the front of the display panel of transmission type to form the image display screen and the display panel of transmission type is provided with a backlight for applying directional light from the rear of the display panel of transmission type.

Preferably, the optical write apparatus further comprises a display panel of transmission type for generating an optical pattern responsive to an image signal, in which the dimmer layer is disposed on the front of and away from the display panel of transmission type to form the image display screen and a two-dimensional lens array for forming an optical pattern on the display panel of transmission type on the dimmer layer is placed between the display panel of transmission type and the dimmer layer.

Preferably, there is provided the optical write apparatus in which the role switch section switches the image display screen between the roles by switching one of a position and attitude of at least one of members forming the optical write apparatus into one of a different position and a different attitude.

Preferably, there is provided the optical write apparatus in which the role switch section switches the image display screen between the roles by switching display of the image display screen between an image for observation and an image for writing onto the image record medium.

Preferably, the optical write apparatus in which the display of the image display screen is switched between the images different in display mode.

Preferably, there is provided the optical write apparatus in which the display of the image display screen is switched between the images different in optical characteristic.

Preferably, the optical write apparatus further comprises:
an operation device; and
a communication section connected to a communication line for making access responsive to operation of the operation device and for receiving an image via the communication line, wherein the image display screen is switched between the roles as the image received by the communication section is displayed on the image display screen.

BRIEF DESCRIPTION OF THE DRAWINGS

In the accompanying drawings:

FIG. 17 is a drawing to show the basic configuration of a dimmer layer;

FIGS. 19(a) and 19(b) are drawings to show the image display screen shown in FIG. 1;

DETAILED DESCRIPTION OF THE PREFERRED EMBODIMENTS

Referring now to the accompanying drawings, there are shown preferred embodiments of the invention.

Figure 4:
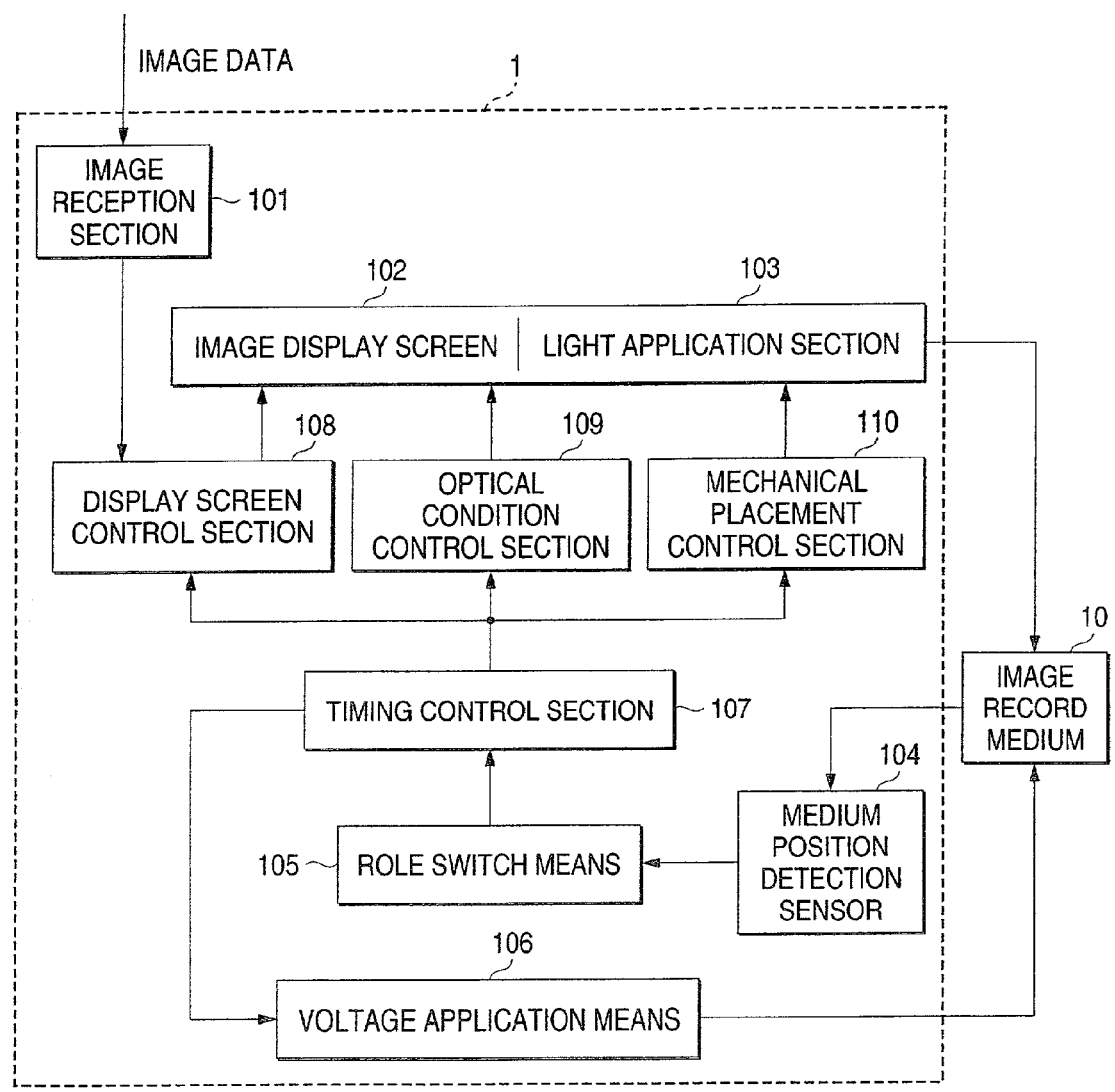
FIG. 4 is a block diagram to represent the basic configuration containing optical write apparatus of first to sixth embodiments of the invention

FIG. 4 is a block diagram to represent the basic configuration containing optical write apparatus of first to sixth embodiments of the invention.

The blocks making up the basic configuration containing the optical write apparatus of the first to sixth embodiments of the invention, which will be hereinafter collectively called optical write apparatus 1, are surrounded by the dotted line in FIG. 4. FIG. 4 also shows an image record medium 10 onto which an image is written using irritation of application of light for representing the image.

The optical write apparatus 1 shown in FIG. 4 comprises an image reception section 101 for receiving any image data from the information sources of computers, TVs, fixed telephones, mobile telephones, and other various information machines connected to networks, a player of an information record medium on which image information is stored, and the like.

The optical write apparatus 1 also comprises an image display screen 102 for displaying an image based on the received information and a light application section 103.

The optical write apparatus 1 also comprises a role switch section 105 for switching the image display screen 102 between the role in displaying an image for observation and the role in displaying an image for writing onto the image record medium 10 onto which an image is written upon application of light for representing the image. This role switch section 105 switches the image display screen 102 between the roles by switching the optical nature of the image on the image display screen 102 into different optical nature.

The optical write apparatus 1 further has a dimmer layer (described later) switched reversibly between light dispersion mode and light transmission mode in response to a control signal. The role switch section 105 switches the optical nature of the image on the image display screen 102 by switching the dimmer layer between the light dispersion and transmission modes.

The optical nature mentioned here contains not only the directivity, the amount, and the wavelength of the applied light emitted from the optical write apparatus 1, but also display mode change of switching the image display screen 102 between reflection display for image observation and transmission display for image write. For example, the image display screen 102 uses a liquid crystal panel of semi-transmission type and to write an image onto the image record medium 10, light exposure is conducted with a backlight light source having directivity from the rear of the liquid crystal panel, thereby switching between an image for observation and an image for write. As specific examples for switching into an image different in display mode, not only the image size, image rotation, inversion, font type, font size, vertical line orientation, horizontal line orientation, character spacing, line spacing, gradation representation method (binary display, multilevel display, or the like), presence or absence of image trimming, image display position (centering, right, left, top, bottom justification), etc., but also full-screen display of only content with an operation task bar hidden and the like are named. As specific examples for switching into an image different in optical nature, adjusting of image brightness, contrast, etc., is also included. To change the image size, if a liquid crystal panel of transmission type or the like is the screen of the optical write apparatus 1, it is easy to scale up or down an image on image data; if projection of light from a projector onto a screen in a dispersion state is used as a screen, the physically displayed image size can also be reduced or enlarged by using a lens with variable focus or the like aside from a normal projection lens.

The role switch section 105 switches the image display screen 102 between the roles by switching the position or attitude of at least one of the members making up the optical write apparatus 1 into a different position or attitude.

As for the position or attitude mentioned here, when an image is observed, the image display screen 102 is set to an angle or height for the observer to easily view; when an image is written, for example, to bring the image record medium 10 into intimate contact with the image display screen 102 as much as possible in parallel for easy placement, the inclination of the image display screen 102 is loosened so as to become close to the horizontal or the screen height is changed. When an image is observed, a substance blocking the display screen cannot be placed: when an image is written, a member such as a connection connector for applying a voltage to the image record medium 10, a tray for setting the image record medium 10, or an optical attachment such as a two-dimensional lens array to form screen information on the image record medium 10 can appear with the member held on an expandable support member on the image display screen 102.

An image is written onto the image record medium 10 upon reception of both irritations of application of light for representing an image and a voltage. The optical write apparatus 1 comprises voltage application section 106 for applying an image write voltage to the image record medium 10. The role switch section 105 causes the dimmer layer (described later) to make a transition to the light transmission mode at the timing adjusted in the timing at which the voltage application section applies the image write voltage to the image record medium 10 and then again causes the dimmer layer to make a transition to the light dispersion mode.

Further, the dimmer layer is divided into a plurality of areas that can be controlled separately between the light dispersion mode and the light transmission mode. The optical write apparatus 1 comprises a medium position detection sensor 104 for sensing the position of the image record medium 10 on the image display screen 102 (an example of sense section mentioned in the invention), and the role switch section 105 also switches only the area of the dimmer layer overlapping the image record medium 10 into the light transmission mode to write an image onto the image record medium 10.

The optical write apparatus 1 further comprises a display screen control section 108, an optical condition control section 109, and a mechanical placement control section 110 for controlling the display screen, the optical condition, and the mechanical placement respectively in response to the role set by the role switch section 105.

Each of the image display screen 102 and the light application section 103 for applying light onto the image record medium 10 can use not only a liquid crystal panel of transmission type having a backlight, but also a CRT (cathode-ray tube), FED (field emission display), a display of self-light emission type as a two-dimensional array of fluorescent display elements, plasma light emission elements, EL light emission elements, LED light emission elements, etc., a projector type display for projecting an image onto a screen having a light dispersion property for display, or the like.

Here, the image record medium 10 onto which an image is written upon reception of irritation of light for representing the image from the optical write apparatus 1 will be discussed in detail.

As the image record medium 10 onto which an image is written upon reception of irritation of light, an image record medium comprising a photosensitive layer and a display layer can be used. To use a photochromism material where a color development reaction directly occurs as the photosensitive Layer, it can serve as both photosensitive and display layers and thus the configuration of the medium can be simplified; however, since discharge caused by wavelength light other than the write light easily occurs, the photochromism material lacks stability of an image. On the other hand, to form the photosensitive layer of a photoconductive material, impedance change caused by light exposure is used and thus only when a voltage is applied, the display layer is affected and the photosensitive layer is preferred in the point of maintainability of the recorded image. As such a photosensitive layer, selenium, amorphous silicon, zinc oxide, BSO, etc., can be applied as an inorganic family; particularly amorphous silicon provides a high level of safety for human bodies, a bipolar carrier occurs, and the mobility of carrier is also high and thus amorphous silicon is preferred. However, more preferably an organic-family material having good suitability for a flexible substrate as a sheet-like display record medium and not requiring high-temperature heat treatment or a processing taking time in the manufacturing process is used. The photoconductive layer formed of such an organic-family material can use a material used as a photoconductor used in an electrophotographic process. As organic-family photoconductive material, a material for performing charge generation and charge transport at the same time can also be applied; generally, as a separate charge generation layer and a separate charge transport layer are provided as separate functions, a good photosensitive characteristic is shown and thus the composition is often used. Specifically, as a charge generation layer material, an organic material to generate charges upon application of light, such as perylene family, phthalocyanine family, bis azo family, dithiopitokero pyrrole family, squalilium family, azulenium family, or thiapyrilium polycarbonate family, can be applied. As a producing method of the charge generation layer, not only a dry film formation method such as a vacuum evaporation method or a sputter method, but also a spin coat method using a solvent or a dispersant, a dip method, etc., can be applied. As a charge transport material for forming the charge transport layer, trinitrofluorene family, polyvinyl carbazole family, oxadiazole family, pyrarisone family, hydrazone family, stilbene family, triphenyl amine family, triphenyl methane family, diamine family, etc., can be applied. An ion conductive material such as polyvinyl alcohol or polyethylene oxide to which LiClO is added can also be applied. As a producing method of the charge transport layer, not only a dry film formation method such as a vacuum evaporation method or a sputter method, but also a spin coat method, a dip coat method, an applicator method, a dye coat method, etc., of applied liquid produced with a solvent or a dispersant can be applied.

If the organic photoconductive layer comprises at least a charge generation layer, a charge transport layer, and a charge generation layer deposited on each other in this order, it is made possible to apply AC voltage to the display layer and a general-purpose liquid crystal material can be used as the display layer and thus the composition is preferred. Further, the composition wherein a charge generation layer is produced in a charge transport layer to form charge generation layer, charge transport layer, charge generation layer, charge transport layer, charge generation layer can also be applied.

To use a photoconductive material as the photosensitive layer, a display material having electric field responsivity or a material for displaying upon energization of an electric current can be used as the display layer. As the display material of the former, a display element containing ferro-electric liquid crystal of nematic liquid crystal, smectic liquid crystal, chiral smectic C phase, etc., liquid crystal of discotheque, cholesteric family, etc., a guest host liquid crystal element comprising them to which a dichromatic pigment is added as guest, a display element using electrophoresis, a display element using electro-endosmosis, a display element using rotation of particles painted properly in two colors, a display element using jet caused by an electric field of colored charged particles or charge-poured particles, a display element using flake orientation having electric field responsivity, and the like can be applied. As the above-mentioned display material, the whole may be sealed in a microcapsule and the microcapsule may be scattered in a binder to form a display layer. In this case, the display layer can be formed in an application process and the machine-resistant characteristic after the display layer is formed is excellent and an image record medium can be roughly handled and can be formed like a lightweight and slim sheet; this case is more preferred. As liquid crystal family material, liquid crystal scattered in a high polymer, a high polymer is a little mixed in liquid crystal, or the liquid crystal itself put into a high polymer can also be used. On the other hand, as the display element having electric field responsivity of the latter, an inorganic or organic family display material to generate an electrochromic phenomenon can also be used.

Among the above-mentioned display elements, particularly the display element using electrophoresis or rotation of two-color particles, the display element using jet caused by an electric field of colored charged particles or charge-poured particles, or display material containing ferroelectric liquid crystal of smectic liquid crystal, chiral smectic C phase, etc., cholesteric material, or the like as the basis has a memory property of display and can maintain the display contents without requiring a battery still after voltage is applied, so that it can be separated from the write apparatus for realizing operability like paper. Particularly, the display element consisting mainly of cholesteric material does not require a polarizing plate or a color filter and can produce color display having high reflectivity using a selective wavelength reflection characteristic and thus is preferred. To produce color display using selective reflection display of the cholesteric material, a light absorption layer is provided as the ground of the cholesteric material layer, whereby viewability of reflected light is more enhanced. As such a light absorption layer, a photoresist material, etc., used for a black matrix of LCD, etc., can be used.

Glass, plastic, or the like can be used as a support base material of such an image record medium; it is desirable that plastic material should be used because it has flexibility close to a paper hardcopy and is excellent in machine strength resisting rough handling. As such a plastic substrate, a polyester family film of polyethylene terephthalate, etc., polycarbonate, polyimide, etc., can be used. Preferably, the substrate has a thickness of about 75 μm to 500 μm with respect to self-supportability, flexibility, lightweight, thickness at the stacking time, and the like.

If a photoconductive layer and a display layer are used in combination as the composition of an image record medium, the voltage application section of the optical write apparatus and the electrode of the image record medium need to be electrically connected for applying a voltage to the image record medium. As such a configuration, a configuration wherein a contact terminal drawn out from two substrate electrodes of the image record medium and a contact terminal connected to the voltage application section in the optical write apparatus are connected detachably with a single motion by a clip-like connector makes it possible to readily write an image onto the image record medium and easily carry and thus is desirable.

Figure 5:
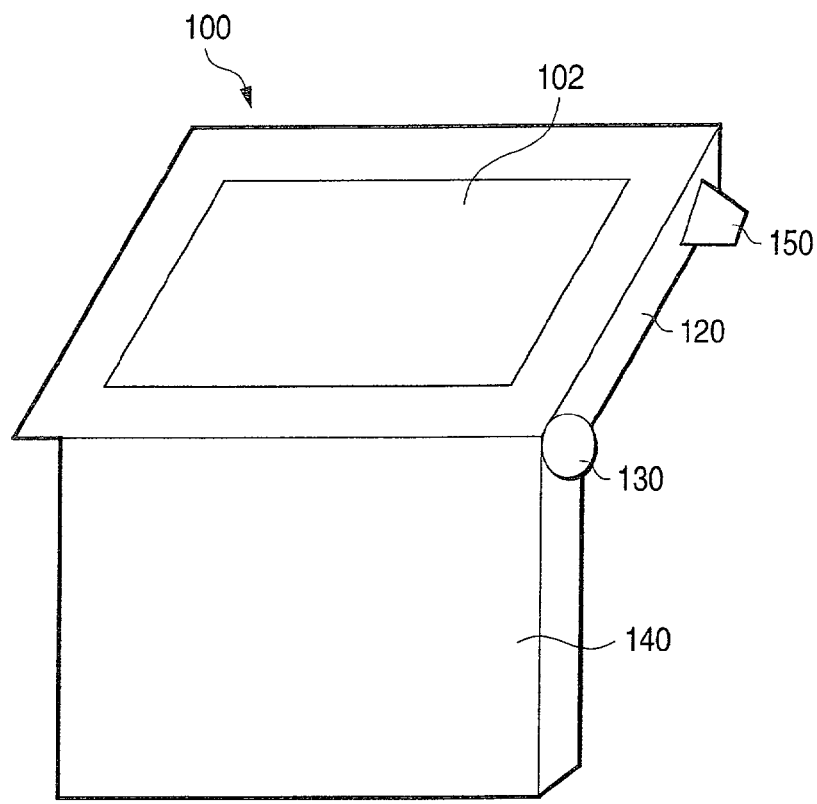
FIG. 5 is a drawing to show a state in which an optical write apparatus of a first embodiment of the invention is switched into the attitude for image observation.
Figure 6:
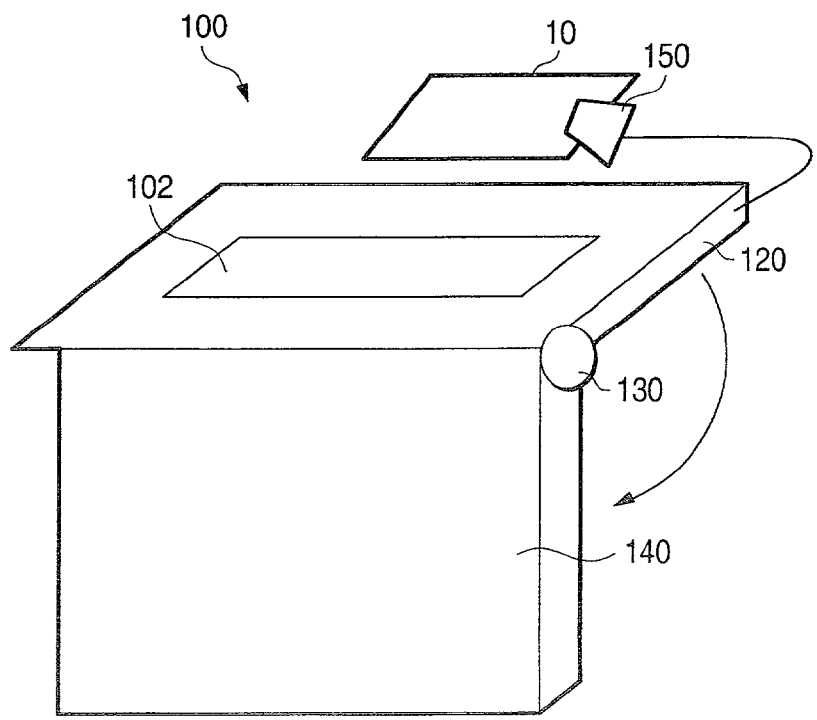
FIG. 6 is a drawing to show a state in which the optical write apparatus shown in FIG. 5 is switched into the attitude for image write.

FIG. 5 is a drawing to show a state in which an optical write apparatus 100 of a first embodiment of the invention is switched into the attitude for image observation. FIG. 6 is a drawing to show a state in which the optical write apparatus shown in FIG. 5 is switched into the attitude for image write.

The optical write apparatus 100 of the first embodiment of the invention comprises an image display screen 102 on the top and a member 120 for housing a connector with a cable for supplying power to an image record medium 10 on a side. This member 120 is supported by a hinge part 130 for rotation to a main unit cabinet 140. The image display screen 102 can be set to such an angle to enable the user to naturally view the screen when the user observes the screen. For the user to write an image on the image display screen 102 onto the image record medium 10, first the user draws out the connector part 150 housed in the member 120 as shown in FIG. 6. Then, the event is sensed and an internal motor (not shown) slowly operates for rotating the hinge part 130, thereby switching the attitude of the member 120 from the inclined state to horizontal state. Next, the user attaches the connector part 150 to the image record medium 10 and sets the image record medium 10 on the image display screen 102 set in the horizontal state. The angle of the image display screen 102 is changed to the horizontal orientation in which the image record medium 10 can be easily set. At such an angle, the image record medium 10 set on the image display screen 102 does not slip down, so that the image record medium 10 can be positioned easily. The image record medium 10 can also be brought into intimate contact with the image display screen 102.

In the description, the example wherein the image display screen 102 is set to an angle for the user to easily view the screen at the image observation time has been given. However, a configuration wherein the position of the member 120 is moved downward with the angle remaining in FIG. 6 may be adopted and the image display screen 102 may be set to a height for the user to easily view the screen so that the user observes an image on the image display screen 102.

Next, the configuration of the image display screen 102 for displaying an image and writing onto the image record medium 10 in the optical write apparatus 100 of the embodiment will be discussed. The image display screen 102 uses a backlight having directivity and a liquid crystal panel of transmission type. The directional backlight is a two-dimensional dense array of white LEDs each having directivity of ±4° and the liquid crystal panel is a general TN liquid crystal panel. Further, a film comprising a nematic liquid crystal layer scattered in a polymer like drops as a dimmer layer that can be controlled reversibly between light transmission and dispersion modes, the layer being sandwiched between paired film substrates having a transparent electrode, (for example, umfilm of Nihon Itagarasu Umproducts) is placed between the directional backlight and the liquid crystal panel.

When an image is observed, no electric field is applied to the dimmer layer and thus the light dispersion mode is entered, wherein emission light of the directional backlight is properly diffused and the display screen of the liquid crystal panel of transmission type is also easy to view at a wide viewing angle. After-the angle of the image display screen is changed for preparing for writing onto the image record medium 10 as described above, the light dispersion mode is still entered for enabling the user to easily check the screen unless a voltage is applied to the image record medium 10. After the image record medium 10 is positioned in the image write area and a button for starting to apply a voltage to the image record medium 10 is pressed, a predetermined voltage is also applied to the dimmer layer in synchronization with a signal of the button and the mode is switched into the light transmission mode. According to the operation, the light of the directional backlight arrives at the photoconductive layer of the image record medium 10 through the liquid crystal panel without being dispersed, and an electric field responsive to the light pattern can be applied to the liquid crystal layer for instantaneously writing the image on the image display screen onto the image record medium 10.

Figure 7:
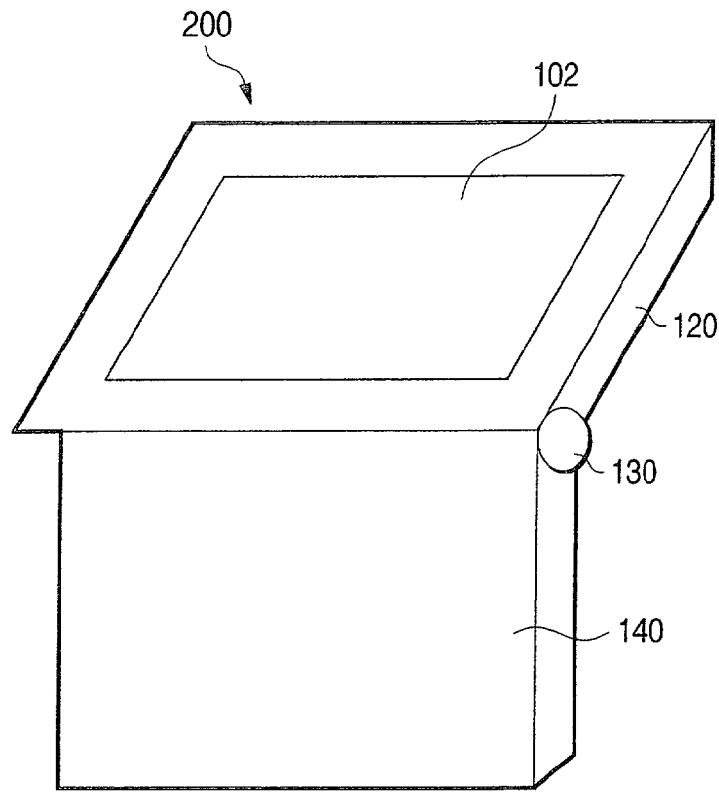
FIG. 7 is a drawing to show a state in which an optical write apparatus of a second embodiment of the invention is switched into the attitude for image observation.
Figure 8:
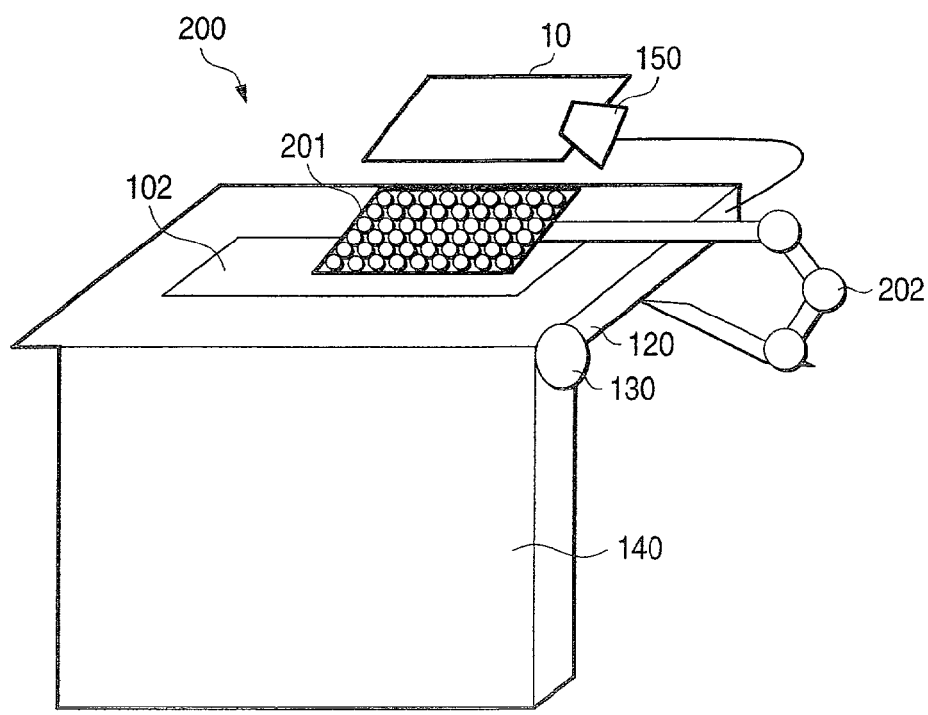
FIG. 8 is a drawing to show a state in which the optical write apparatus shown in FIG. 7 is switched into the attitude for image write.

FIG. 7 is a drawing to show a state in which an optical write apparatus 200 of a second embodiment of the invention is switched into the attitude for image observation. FIG. 8 is a drawing to show a state in which the optical write apparatus shown in FIG. 7 is switched into the attitude for image write.

Components identical with those of the optical write apparatus 100 previously described with reference to the accompanying drawings are denoted by the same reference numerals in FIGS. 7 and 8.

As shown in FIG. 7, when an image display screen 102 forming a part of the optical write apparatus 200 is switched into the attitude for image observation, the image display screen 102 is not blocked. As shown in FIG. 8, when the image display screen 102 is switched into the attitude for image write, a two-dimensional lens array 201 for forming an image on the image display screen 102 on an image record medium 10 appears with the lens array 201 held on an expandable support member 202 on the image display screen 102. A usual liquid crystal panel of transmission panel having a diffusion backlight is used as the image display screen 102; however, a CRT or any other electronic display used for a general monitor may be used, of course. Such a display would enable the user to perform operation of viewing information, menu selection, etc., in a similar easy-to-view manner to that of viewing a normal monitor at the image observation time. When preparation for writing onto the image record medium 10 is made in a similar manner to that in the optical write apparatus 100 of the first embodiment described above, the angle of the image display screen 102 is changed so that the image display screen 102 is placed in a horizontal orientation, and further the two-dimensional lens array 201 held on the expandable support member 202 usually stored at the rear of the image display screen 102 appears on the image display screen 102. The two-dimensional lens array 201 can be positioned under the control of the support member 202 automatically so that the light emission point of the image display screen 102 is brought into focus, and a positioning spacer is formed integrally in the periphery of the top of the two-dimensional lens array 201 so that the photoconductive layer of the image record medium 10 is brought into focus as the image record medium 10 is simply placed on the top of the two-dimensional lens array 201. Thus, the image record medium 10 is placed on the optical write apparatus 200 on which the two-dimensional lens array 201 is set and a voltage is applied, whereby a clear image can be written onto the image record medium 10.

Figure 9:
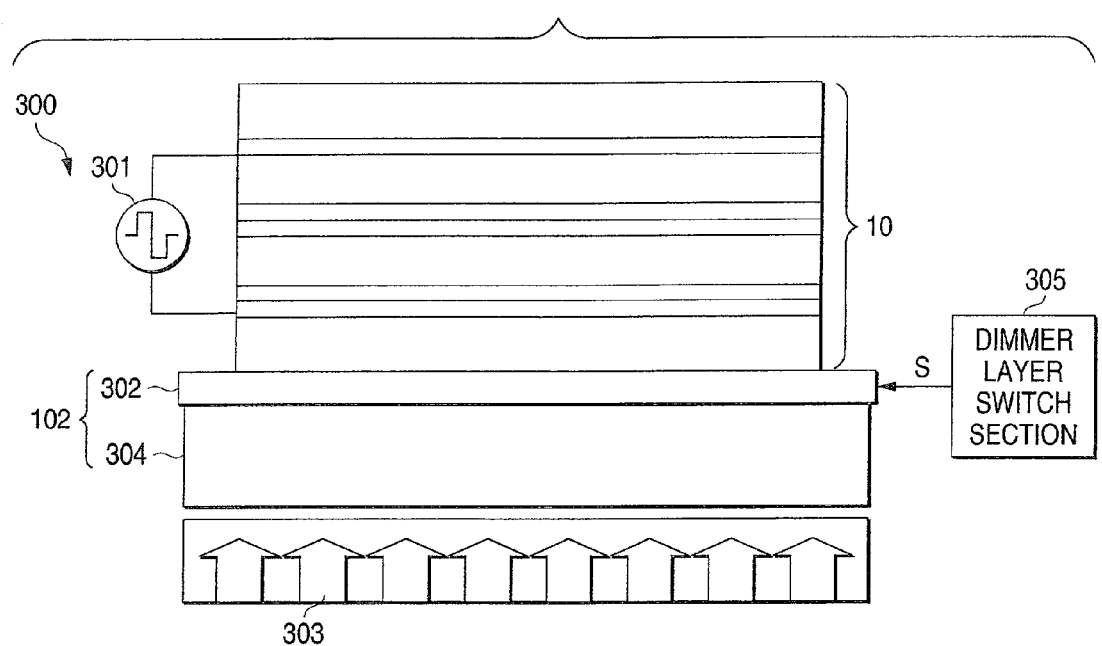
FIG. 9 is a sectional view of the configuration of an optical write apparatus of a third embodiment of the invention.

FIG. 9 is a sectional view of the configuration of an optical write apparatus 300 of a third embodiment of the invention.

The optical write apparatus 300 of the embodiment comprises a transmission type liquid crystal panel 304 for generating an optical pattern responsive to an image signal and a dimmer layer 302 being placed on the front of the transmission type liquid crystal panel 304, making up an image display screen 102. Further, the transmission type liquid crystal panel 304 is provided with a backlight application section 303 (corresponding to the light application section 103 shown in FIG. 4) for applying directional light from the rear of the transmission type liquid crystal panel 304. When an image is observed, a film comprising a nematic liquid crystal layer scattered in a polymer like drops as the dimmer layer 302, the layer being sandwiched between paired film substrates having a transparent electrode, (for example, umfilm of Nihon Itagarasu Umproducts) is placed in the light dispersion mode, so that the pattern passing through the liquid crystal panel 304 from the backlight application section 303 can be observed as a diffused light pattern excellent in viewability. When an image is written onto an image record medium 10, the image record medium 10 is brought into intimate contact with the dimmer layer 302 and a voltage is applied from a pulse generator 301 (corresponding to the voltage application section 106 shown in FIG. 4) to the image record medium 10. In synchronization with this, a characteristic switch voltage signal S (corresponding to control signal mentioned in the invention) is applied from a dimmer layer switch section 305 (corresponding to the role switch section 105 shown in FIG. 4) to the dimmer layer 305 for placing the dimmer layer 305 in a transparent state. Accordingly, the optical pattern having directivity can be projected onto the photoconductive layer of the image record medium 10 without being degraded. Consequently, a system for making it possible to instantaneously write the necessary image onto the image record medium 10 while the user checks the displayed image on the screen can be provided.

Figure 10:
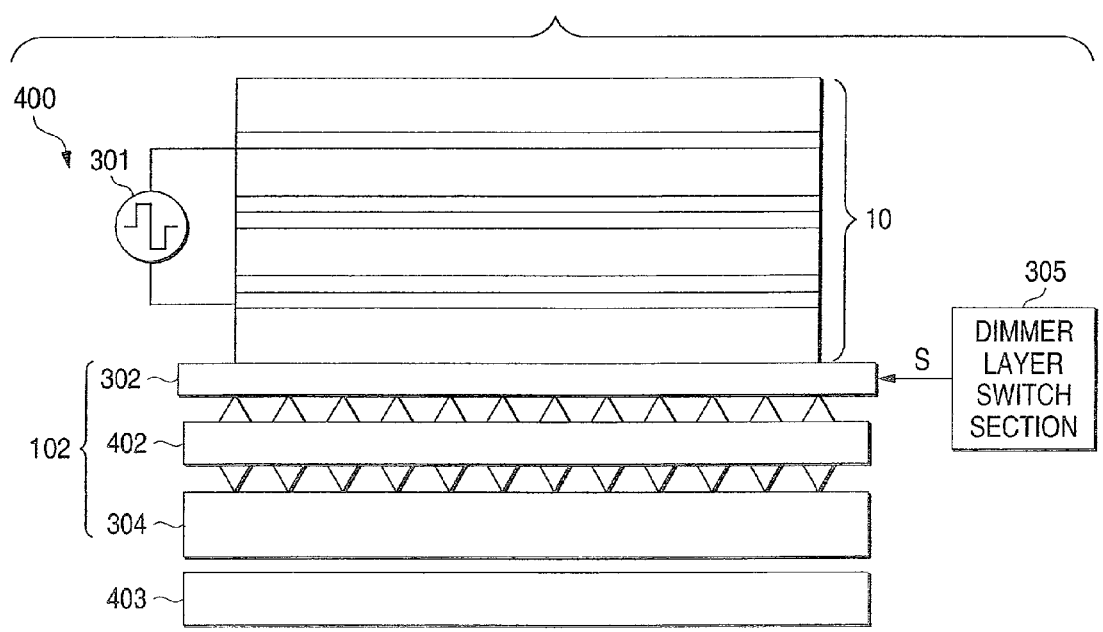
FIG. 10 is a sectional view of the configuration of an optical write apparatus of a fourth embodiment of the invention.

FIG. 10 is a sectional view of the configuration of an optical write apparatus 400 of a fourth embodiment of the invention.

components identical with those of the optical write apparatus 300 previously described with reference to FIG. 9 are denoted by the same reference numerals in FIG. 10.

The optical write apparatus 400 shown in FIG. 10 comprises a transmission type liquid crystal panel 304 for generating an optical pattern responsive to an image signal and a dimmer layer 302 being placed on the front of and away from the liquid crystal panel 304, making up an image display screen 102. Further, a two-dimensional lens array 402 for forming an optical pattern on the liquid crystal panel 304 on the dimmer layer 302 is placed between the liquid crystal panel 304 and the dimmer layer 302. The dimmer layer 302 is switched reversibly between light dispersion and transmission modes in response to a characteristic switch voltage signal S from a dimmer layer switch section 305.

The liquid crystal panel 304 is a general liquid crystal panel using a diffused light source from a normal backlight 403 (corresponding to the light application section 103 shown in FIG. 1) as backlight; if the liquid crystal panel 304 is viewed directly, a display screen excellent in viewability can be provided. In the embodiment, however, when an image is observed, the image once projected onto a diffusion screen through the two-dimensional lens array 402 is observed as the display image. Next, an image record medium 10 is brought into intimate contact with the surface of the dimmer layer 302, the image is switched into an image for image write, and the characteristic switch voltage signal S from the dimmer layer switch section 305 and a voltage from a pulse generator 301 are applied synchronously to the dimmer layer 302 and the image record medium 10, whereby the dimmer layer 302 is placed in a transparent state, the image on the liquid crystal panel 304 is formed through the two-dimensional lens array 402 on the photoconductive layer of the image record medium 10, and a clear reflection image conforming to the optical pattern is recorded on the image record medium 10.

Figure 11:
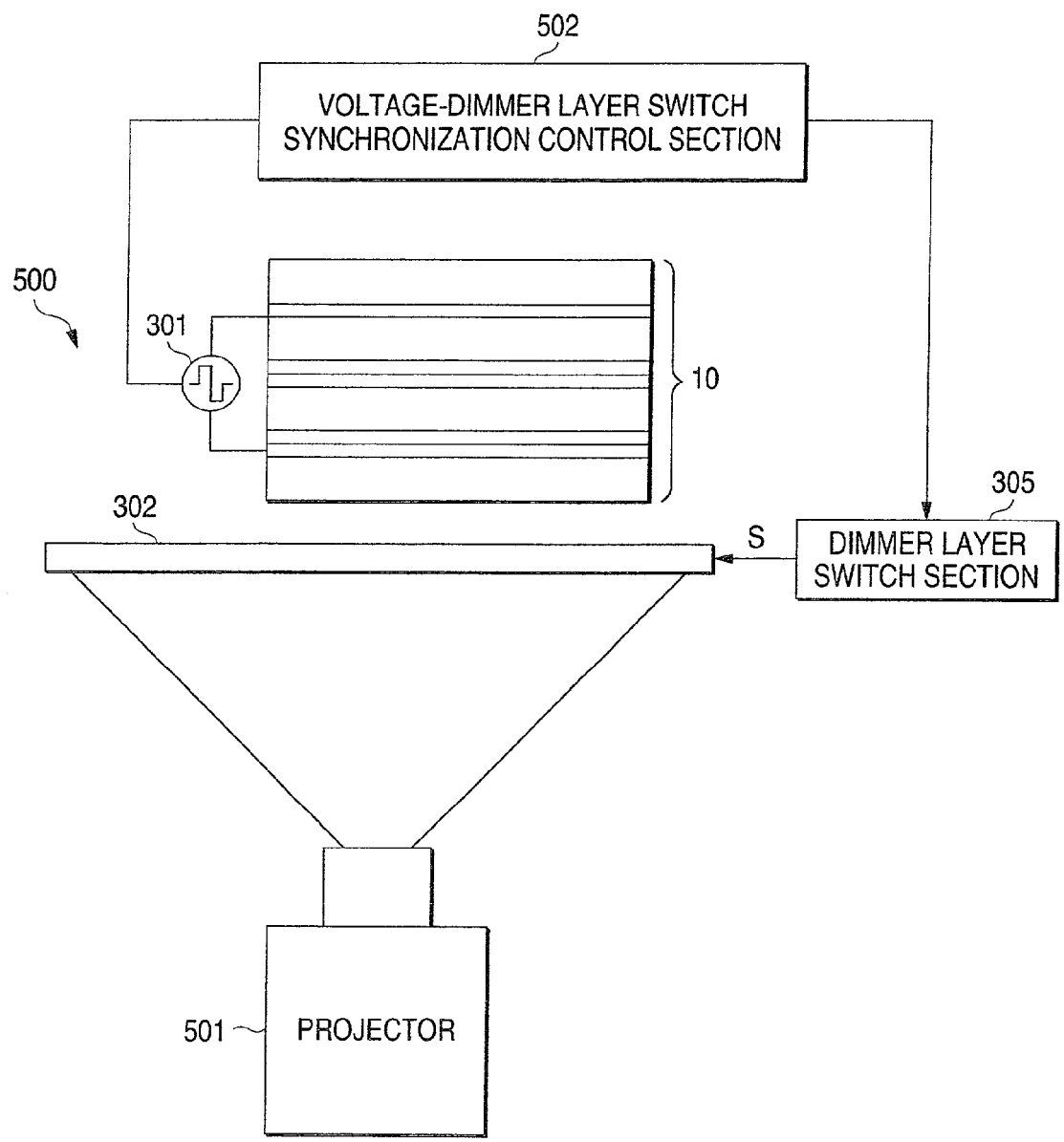
FIG. 11 is a sectional view of the configuration of an optical write apparatus of a fifth embodiment of the invention.

FIG. 11 is a sectional view of the configuration of an optical write apparatus 500 of a sixth embodiment of the invention.

The optical write apparatus 500 comprises a projector 501 and a dimmer layer 302 switched reversibly between light dispersion and transmission modes in response to a characteristic switch voltage signal S (umfilm of Nihon Itagarasu Umproducts) as a display panel for viewing a projected image. The projector 501 adopts a digital light processing technique using a digital micromirror device. The projector 501 adopting this technique provides a high contrast of an optical pattern and a high numerical aperture per pixel and thus can display a blight image. Aside from this, a liquid crystal projector using a transmission type liquid crystal modulation element can also be used.

With the optical write apparatus 500 of the embodiment, when an image is observed, the projector 501 is operated, an image signal is input thereto, and the dimmer layer 302 is brought into focus. In this state, the dimmer layer 302 is placed in the dispersion mode in response to the characteristic switch voltage signal S, whereby the output image from the projector 501 is formed on the dimmer layer 302 and an image excellent in viewability can be provided from the surface of the dimmer layer 302 by forward dispersion. When it becomes necessary to write the displayed image onto an image record medium 10, the image record medium 10 is put on the dimmer layer 302 in the light dispersion mode as the display screen and a voltage is applied from the pulse generator 301 to a pair of electrodes of the image record medium 10. At this time, to apply the voltage to the electrodes of the image record medium 10, the electrodes of the image record medium 10 are sandwiched in a connector with a cable (not shown) connected to the pulse generator 301, the cable tip being shaped like a clip. A button for starting to apply a voltage pulse is placed on the clip-like connector surface and as the button is pressed, a synchronous signal to turn on a relay switch for supplying the characteristic switch voltage signal S from the dimmer layer 302 and a voltage pulse is generated from a voltage-dimmer layer switch synchronization control section 502. Accordingly, while the voltage pulse is applied to the image record medium 10, the characteristic switch voltage signal S to switch the dimmer layer 302 into a transparent state is applied from a dimmer layer switch section 305 to the dimmer layer 302. Thus, the projected image from the projector 501 arrives at the photoconductive layer of the image record medium 10 without being dispersed on the dimmer layer 302, and a good image can be instantaneously written onto the image record medium 10.

Figure 12:
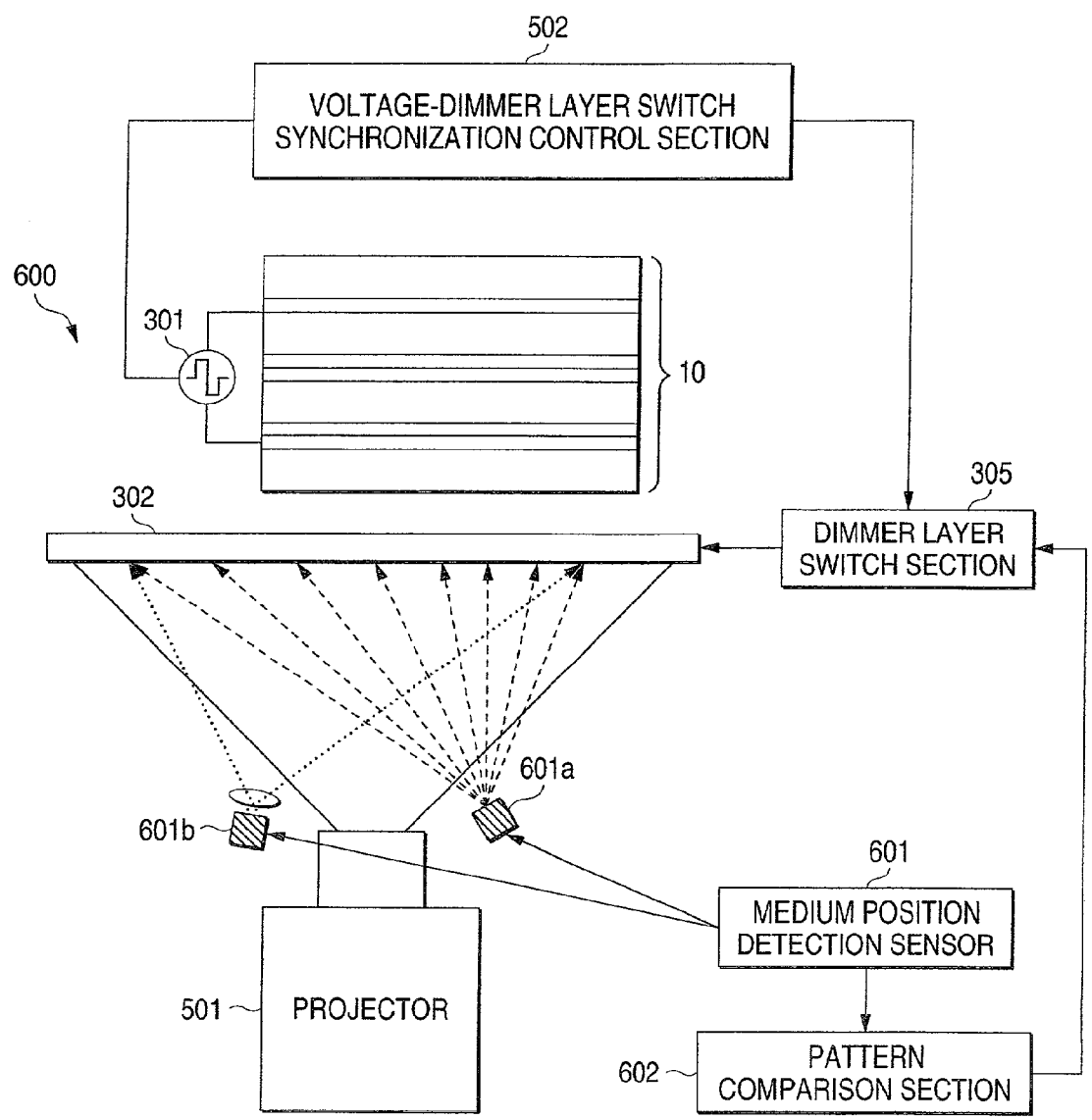
FIG. 12 is a sectional view of the configuration of an optical write apparatus of a sixth embodiment of the invention.

FIG. 12 is a sectional view of the configuration of an optical write apparatus 600 of a sixth embodiment of the invention.

With the optical write apparatus 600 of the embodiment, when an image record medium 10 is placed on a dimmer layer 302 as a display screen, a medium position detection sensor 601 for detecting the position of the image record medium 10 is used. Other components are similar to those of the optical write apparatus 500 previously described with reference to FIG. 11.

The medium position detection sensor 601 comprises an infrared light emission section 601a and an infrared light reception section 601b. To detect the medium position by the medium position detection sensor 601, infrared rays of a given strength are radiated from the infrared light emission section 601a to the whole display screen from the inside of the display screen (dimmer layer 302) and a reflected light pattern is formed through a lens on a two-dimensional CMOS sensor forming the infrared light reception section 601b. At the image observation time, when the user views the display screen and performs menu selection operation, the shadow of a user's hand, finger, etc., maybe sensed on the two-dimensional CMOS sensor; a pattern comparison section 602 is provided for previously storing the sensed reflection patterns as predetermined patterns of the size and shape of the image record medium 10 and comparing the detected patterns with the stored patterns. Thus, only when the image record medium 10 is placed on or approaches the display screen, the image is determined to be a write image and the image for observation is switched into the write image. Accordingly, the transition from the image for observation to the write image can be automatically accomplished simply by the natural action of the user placing the image record medium 10 on the display screen. Further, the two-dimensional CMOS sensor detects the position of the 10 medium placed on the display screen in real time in two-dimensional coordinates and the portion containing at least the detected coordinate area of the dimmer layer 302 of the display screen is selectively placed in a transparent state. Electrodes are configured and wired so that they can be driven separately in several segments of the electrodes so that the dimmer layer 302 can be controlled between transparency and dispersion for each coarse area. The combination of the segment electrodes to which a voltage is applied at the same time is determined corresponding to the coordinates detected by the medium position detection sensor 601. After an image is observed on the described optical write apparatus 600, the image record medium 10 is set to any desired information, a pair of electrodes of the image record medium 10 is sandwiched in a clip-like connector at the tip of a cable connected to a pulse generator 301 for applying a voltage, and any desired voltage pulse is applied. At this time, a button for starting to apply the voltage pulse is placed on the clip-like connector surface and as the button is pressed, a synchronous signal is generated from a voltage-dimmer layer switch synchronization control section 502 and turns on a switch relay connected to a power supply for supplying a characteristic switch voltage signal S to the dimmer layer 302. While the voltage pulse is applied to the image record medium 10, the medium position detection sensor 601 detects the position of the image record medium 10 and only the detected and selected area of the dimmer layer 302 is switched into a transparent state. Next, the light from the projector 501 arrives directly at the photoconductive layer of the image record medium 10 without losing directivity and a good image can be recorded.

Figure 13:
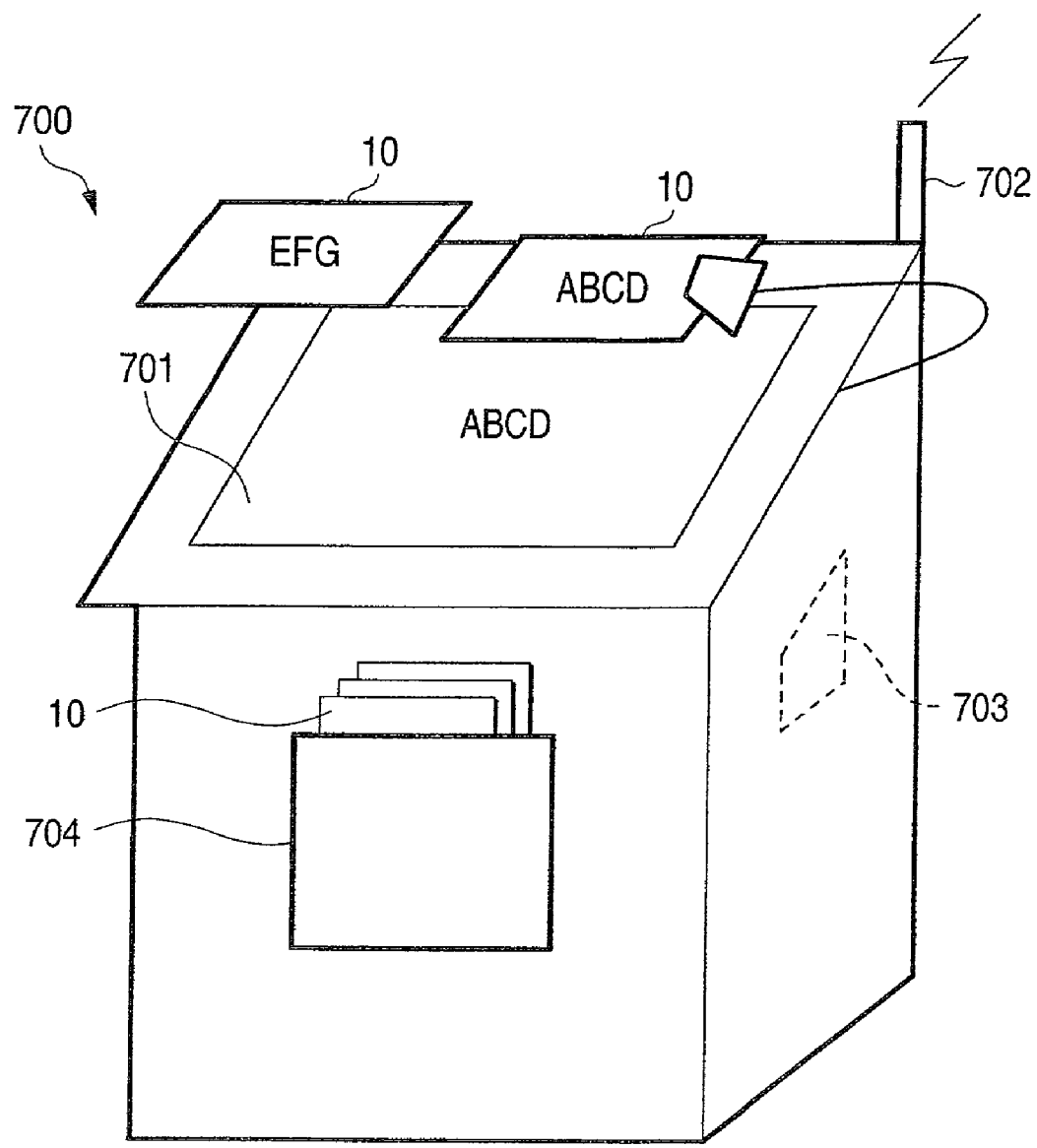
FIG. 13 is a perspective view of an optical write apparatus of a seventh embodiment of the invention.

FIG. 13 is a perspective view of an optical write apparatus 700 of a seventh embodiment of the invention.

The optical write apparatus 700 shown in FIG. 13 is a so-called information kiosk terminal installed in a public installation, a shopping mall, etc. The optical write apparatus 700 comprises a touch panel (an example of operation device mentioned in the invention) having functions of a menu button, etc., (Intellitouch manufactured by Touch Panel Systems) within an image display screen 701. The user can directly touch the menu button, etc., for performing information selection operation through intuition.

The optical write apparatus 700 also comprises a transmission/reception section 702 being connected to a radio communication channel for making access responsive to operation of the touch panel and transmitting/receiving an image via the radio communication channel, image display control section 703 for displaying the image received by the transmission/reception section 702 on the image display screen 701, and a tray 704 for storing an image record medium 10.

With the optical write apparatus 700, after the user views information on the image display screen 701, he or she brings the image record medium 10 close to the top of the image display screen 701, whereby the image for observation is switched into a write image in a similar manner to that of the optical write apparatus 600 previously described with reference to FIG. 12. Then, the user presses a command button for applying a voltage pulse to the image record medium 10, whereby any desired image can be transferred to the image record medium 10 in a similar manner to that of the optical write apparatus 500 previously described with reference to FIG. 11.

Figure 14:
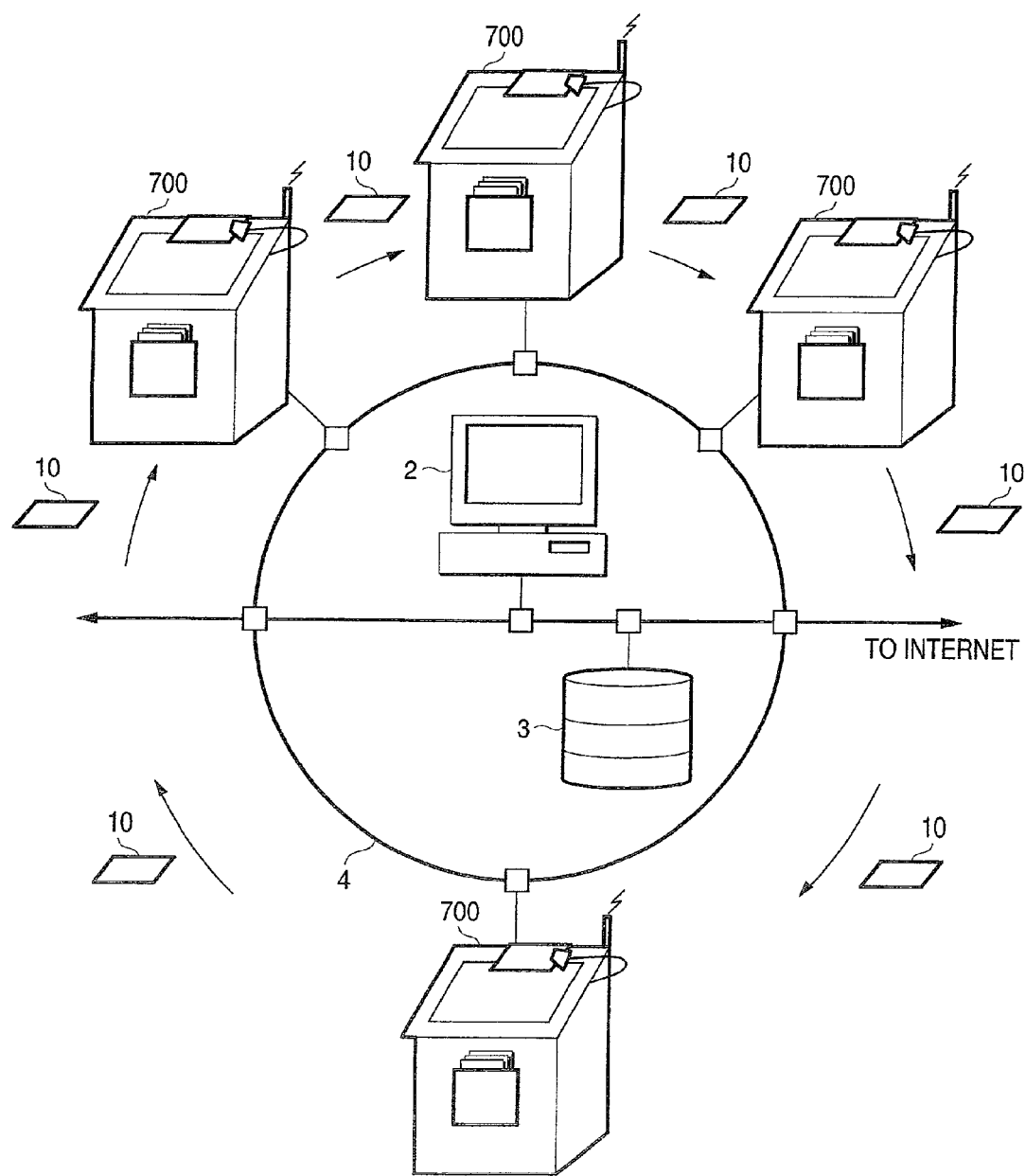
FIG. 14 is a drawing to show an example wherein the optical write apparatus shown in FIG. 13 is built in a network.

FIG. 14 is a drawing to show an example wherein the optical write apparatus shown in FIG. 13 is built in a network.

FIG. 14 shows a local area network 4 to which a host computer 2 and a storage unit 3 are connected and which is connected to the Internet. A plurality of the optical write apparatus 700 are connected to the local area network 4. They are thus connected, so that a plurality of the optical write apparatus 700 may exchange data with each other or with the host computer 2 or the storage unit 3. As information displayed on the plurality of the optical write apparatus 700 and written onto the image record medium 10, information not only being viewed, but also being carried and used for convenience, such as store information, store position information, daily bargain-priced item advertisement, or a discount coupon, for example, in a shopping mall, etc., is possible. If the optical write apparatus 700 are installed in a hospital, etc., a patient may hold the image record medium 10 also serving as a hospital clinic ID card, etc., over the optical write apparatus 700 for receiving an instruction concerning the medical examination, treatment, or test involved in the patient, a map to the location therefor, and the like. Thus, one or more image record media 10 can be carried between the optical write apparatus 700 installed at different locations for viewing and transferring information at each location to the image record medium 10. Further, such information terminals may be installed at locations where some guide information is displayed, such as a station, a store, a shopping center, a city hall, tourist attractions, a museum, and an art gallery, and while viewing information on the terminals at different locations, the user may transfer information to the same image record medium or rewrite new information onto the same image record medium.

Figure 15:
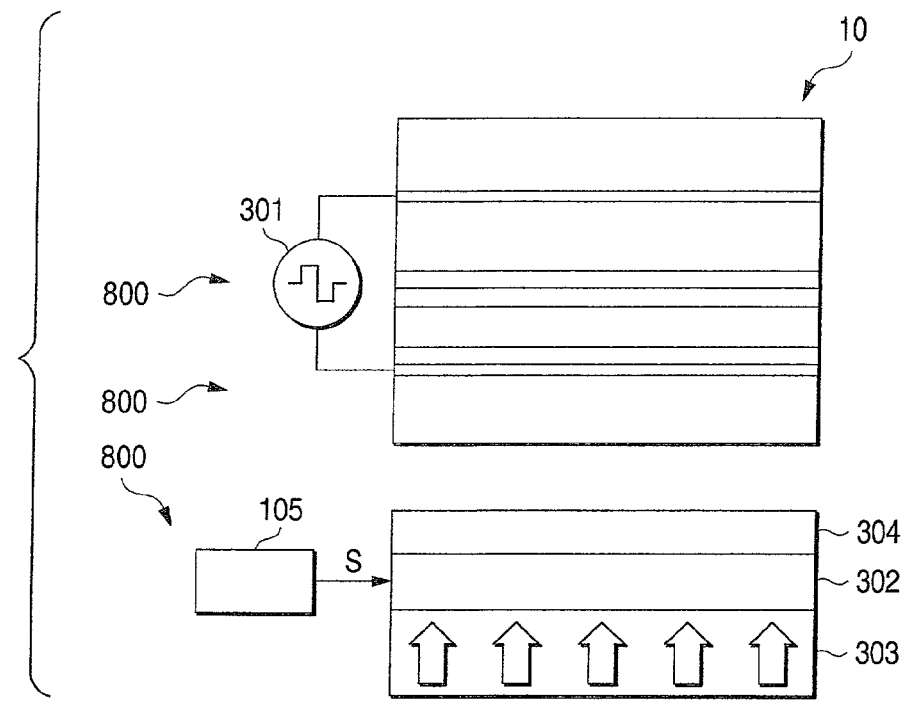
FIG. 15 is a drawing to show the basic configuration of an optical write apparatus of an eighth embodiment of the invention.
Figure 16:
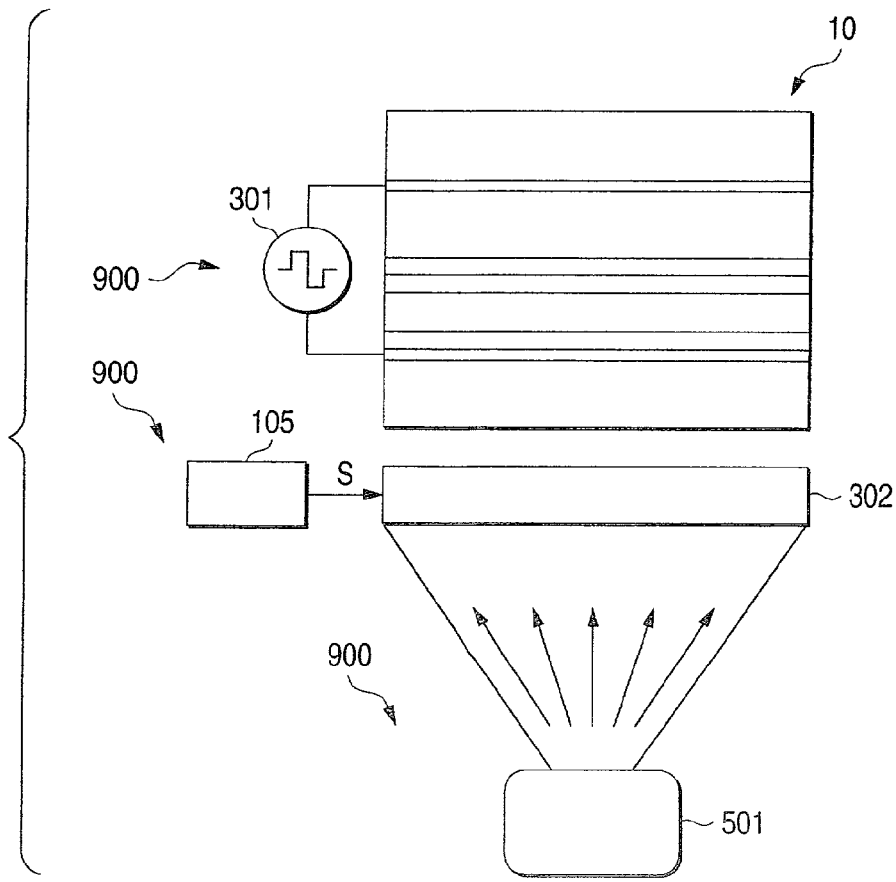
FIG. 16 is a drawing to show the basic configuration of an optical write apparatus of a ninth embodiment of the invention.

FIGS. 15 and 16 show the basic configurations of eighth and ninth embodiments of the invention and FIG. 17 shows the basic configuration and principle of a dimmer layer.

Each of optical write apparatus 800 and 900 shown in FIGS. 15 and 16, as described in detail below, comprises a display panel having an image display screen and a dimmer layer 302 and an image display section for applying light to the display panel from the rear thereof for displaying an image on the image display screen forming a part of the display panel, and role switch section 105 switches the dimmer layer 302 forming apart of the display panel between light dispersion and transmission modes. An image is written onto an image record medium 10 upon reception of both irritations of application of light for representing an image and a voltage. The optical write apparatus 800, 900 comprises a pulse generator 301 as voltage application section for applying an image write voltage to the image record medium 10 when the image record medium 10 is placed on the top of the display panel. Further, the dimmer layer 302 has a structure wherein a nematic liquid crystal layer is scattered in a polymer like particles.

As shown in FIG. 17, the dimmer layer 302 comprises liquid crystal drops (particulate liquid crystal) 302_2 scattered in a polymer 302_1, for example, and when no electric field is applied between paired transparent electrodes 302_3 and 302_4 (mode in FIG. 17 (A)), liquid crystal is oriented at random and the dimmer layer 302 shows dispersion as a whole; when an electric field is applied (mode in FIG. 17 (B) ), liquid crystal is oriented in a specific direction and the dimmer layer 302 becomes transparent as a whole. The dimmer layer 302 is commercially available as a dimmer panel (for example, refer to http://www.nsg.co.jp/umu/index.html). It is changed instantaneously and reversibly between transmission and dispersion (whitish).

FIG. 15 shows the basic configuration of the optical write apparatus 800 for applying backlight to the display panel consisting of the liquid crystal panel and the dimmer layer and displaying an image on the display panel.

The optical write apparatus 800 comprises a backlight application section 303 for applying directional backlight and the dimmer layer 302 (previously described with reference to FIG. 17) placed between the backlight application section 303 and the liquid crystal panel 304. In the embodiment, the combination of the liquid crystal panel 304 and the dimmer layer 302 corresponds to the display panel mentioned in the invention and the combination of the liquid crystal panel 304 and the backlight application section 303 corresponds to the image display section mentioned in the invention.

A characteristic switch voltage signal S from the role switch section 105 is input to the dimmer layer 302 and the optical nature of the dimmer layer 302 is switched instantaneously between light dispersion and transmission modes in response to switching the characteristic switch voltage signal S.

Upon reception of application of backlight from the backlight application section 303, an image is displayed on the liquid crystal panel 304.

The image record medium 10 is placed on the top of the liquid crystal panel 304 as required. FIG. 15 draws as if the liquid crystal panel 304 and the image record medium 10 were away from each other. However, to write an image onto the image record medium 10, the image record medium 10 is brought into intimate contact with the top of the liquid crystal panel 304.

To write an image, a write pulse voltage is applied from the pulse generator 301 to the image record medium 10 placed on the top of the liquid crystal panel 304.

According to the configuration, to begin with, if the dimmer layer 302 is placed in the dispersion mode with no image record medium 10 placed, an optical pattern image output from the liquid crystal panel 304 becomes dispersive and the user can easily view the image directly. When the user wants to transfer the image to the image record medium 10 while checking the image, the user brings the image record medium 10 into contact with the top of the liquid crystal panel 304 and then the dimmer layer 302 is placed in the transmission mode and a predetermined pulse voltage is applied to the image record medium 10, whereby the image can be instantaneously written onto the image record medium 10. In such a configuration, the image record medium 10 may be attached to and detached from the pulse generator 301 only at the two connection points for supplying the voltage applied between the paired electrodes, and it is also easy to attach and detach the sheet before and after the write.

FIG. 16 shows the basic configuration of the optical write apparatus of the ninth embodiment with a projector.

The optical write apparatus 900 uses the dimmer layer 302 as a screen onto which an image is projected by a projector 501. As with the eighth embodiment previously described with reference to FIG. 15, a characteristic switch voltage signal S from the role switch section 105 is input to the dimmer layer 302 and the optical nature of the dimmer layer 302 is switched instantaneously between light dispersion and transmission modes in response to switching the characteristic switch voltage signal S.

The image record medium 10 is brought into contact with the top of the dimmer layer 302. To the image record medium 10 thus placed, a write pulse voltage is applied from the pulse generator 301 for writing an image.

In the configuration shown in FIG. 16, the dimmer layer 302 itself corresponds to the display panel mentioned in the invention and the projector 501 corresponds to the image display section mentioned in the invention.

In the configuration shown in FIG. 16, the optical system of the projector 501 is set so as to form an image at a proper position ahead the projector 501, and the dimmer layer 302 is disposed at the position. If the dimmer layer 302 is placed in the dispersion mode with no image record medium 10 placed, the dimmer layer 302 functions as a screen of the projector 501, so that the formed image is forward dispersed, enabling the user to view the optical pattern image directly from ahead the screen. When the user wants to transfer the image to the image record medium 10 while checking the image, the user brings the image record medium 10 into contact with the top of the dimmer layer 302 and then the dimmer layer 302 is placed in the transmission mode and a predetermined pulse voltage is applied to the image record medium 10, whereby the image can be instantaneously written onto the image record medium 10. If the distance from the projector 501 to the dimmer layer 302 is taken long, the depth of field is increased and if the image record medium 10 is not tightly in contact with the dimmer layer 302, a good image can be transferred.

EXAMPLES

First Example

As a monochrome image record medium, a PET film 125 µm thick with ITO sputtered was used as a substrate and as a cholesteric material display layer, a polyurea capsule into which 74.8 parts by weight of nematic liquid crystal E8 having positive permittivity anisotropy (manufactured by Merck), 21 parts by weight of dextrotropic chiral agent CB15 (manufactured by EDH), and 4.2 parts by weight of R011 (manufactured by Merck) are put by an interface polymerization method was mixed with binder resin for print coating. A photoconductive layer was formed of a charge generation layer of perylene-based pigment and a charge transport layer comprising a hole transport material of triphenyl amine family scattered in binder resin. Black resin about 1 µm thick was used as a light absorption layer. Accordingly, there can be provided a monochrome image record medium which is about 0.3 mm thick, is flexible, changes in color between blue green and transparency (background black) and enables write in batch upon application of light.

The basic configuration of an apparatus is as shown in FIG. 15 and a directional backlight and a liquid crystal panel were used as apparatus for writing an image onto the optical write image record medium described above. A backlight comprising a two-dimensional dense array of LEDs each having directivity of ±4° was used as the directional backlight and a general TN liquid crystal panel was used as the liquid crystal panel. A film comprising a nematic liquid crystal layer scattered in a polymer like drops shown in FIG. 17, sandwiched between paired film substrates having a transparent electrode (for example, umfilm of Nihon Itagarasu Umproducts) was used as a dimmer layer placed between the directional backlight and the liquid crystal panel.

The directional LEDs of the image write apparatus were turned on with no image record medium put on the image write apparatus, image information was input to the liquid crystal panel, and the dimmer layer was placed in the dispersion mode with no voltage applied. Then, a dispersive image was displayed on the liquid crystal panel and was able to be visually checked easily and the liquid crystal panel was able to be used as a display. When it became necessary to copy the displayed image onto the image record medium, the image record medium was put on the liquid crystal panel and any desired voltage was applied to a pair of electrodes of the image record medium and at the same time, a voltage required for changing the dimmer layer to the transmission mode was also applied to the dimmer layer. Then, the light of the directional backlight arrived at the photoconductive layer of the image record medium through the liquid crystal panel without being dispersed and as an image signal, the image was able to be instantaneously formed on the image record medium in conjunction with the voltage applied to the image record medium. Consequently, one slim liquid crystal panel was able to serve as both a display and a write panel and it was made possible to provide a system that can instantaneously copy the necessary image onto the image record medium while the user checks the image.

(Second Embodiment)

The basic configuration of an apparatus is as shown in FIG. 16. The monochrome image record medium in the first example was used, a projector was used as optical write apparatus, and a transmission-dispersion reversible layer was used as a display panel for checking an image projected from the projector. As the projector, preferably a digital light processing technique using a digital micromirror device is adequate, but a liquid crystal type using a small-sized liquid crystal panel may be adopted. As the dimmer layer for use as the display panel, umfilm of Nihon Itagarasu Umproducts similar to that in the first example was used.

The projector was operated with no image record medium placed, an image signal was input to the projector, and the dimmer layer is brought into focus. In this state, when the dimmer layer was placed in the dispersion mode with no voltage applied to the dimmer layer, the output image from the projector was formed on the dimmer layer and the formed image is forward dispersed, enabling the observer to check the image from ahead. When it became necessary to copy the displayed image onto the image record medium, the image record medium was put on the dimmer layer and any desired voltage was applied to a pair of electrodes of the image record medium and at the same time, a voltage required for changing the dimmer layer to the transmission mode was also applied to the dimmer layer. Then, the light pattern from the projector arrived at the photoconductive layer of the image record medium without being dispersed and as an image signal, the image was able to be instantaneously formed on the image record medium in conjunction with the voltage applied to the image record medium. Consequently, if one projector exists, the dimmer layer was able to serve as both a display and a write panel simply by switching the dimmer layer and it was made possible to provide a system that can instantaneously copy the necessary image onto the image record medium while the user checks the image. Generally, if the depth of field of the projector is designed to be large, a clear image can be transferred even in a state in which the image record medium is not in intimate contact with the dimmer layer.

Figure 18:
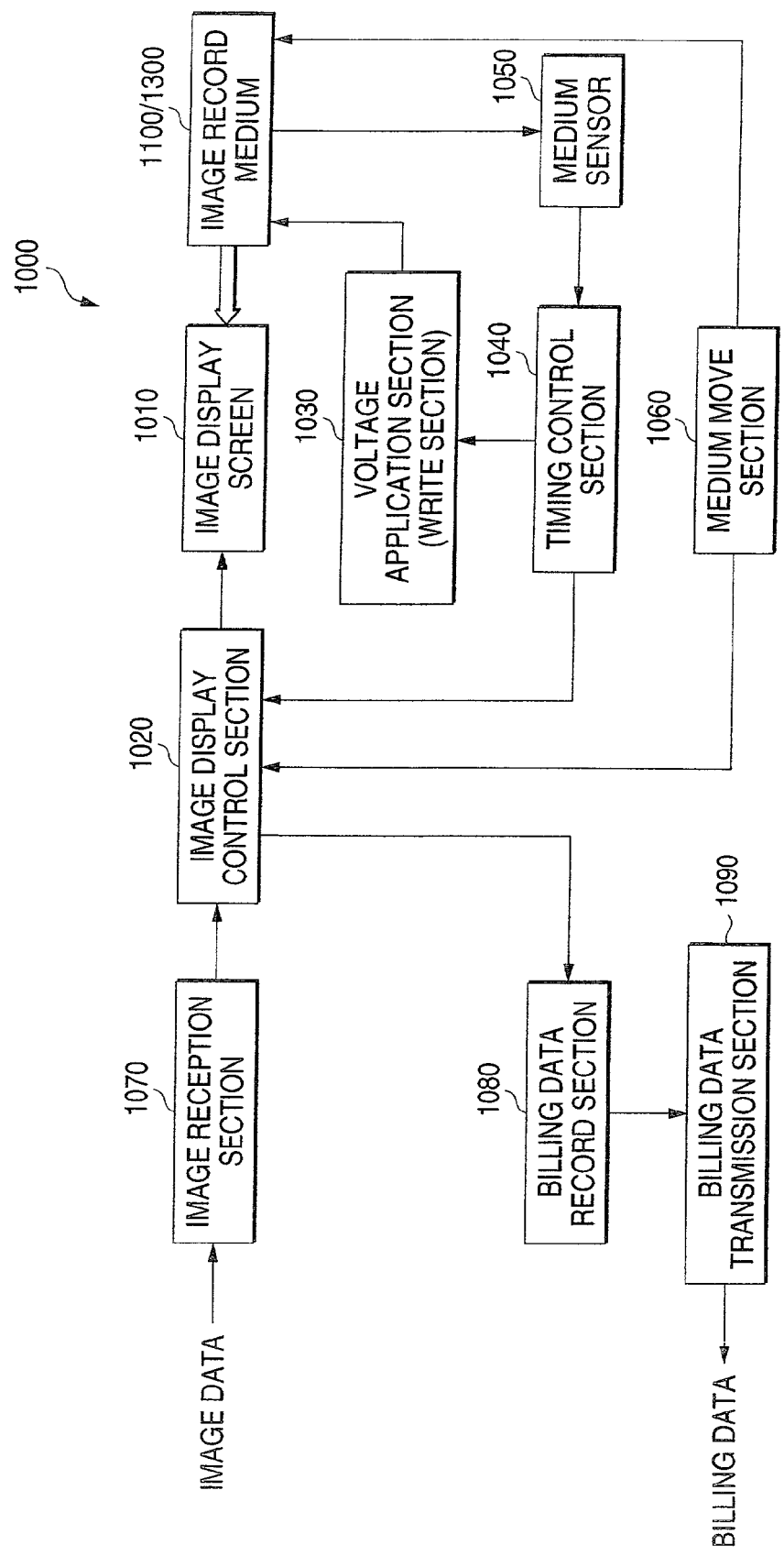
FIG. 18 is a block diagram of an optical write apparatus of a tenth embodiment of the invention.

FIG. 18 is a block diagram of an optical write apparatus 1000 of a tenth embodiment of the invention.

In the optical write apparatus 1000 of the tenth embodiment, as described in detail below, an image display control section 1020 serves as role switch section mentioned in the invention and switches an image display screen 1010 between the role in displaying an image for observation and the role in displaying an image for writing onto an image record medium 1100 (or 1300) by switching display between the image for observation and the image for writing onto the image record medium 1100.

The optical write apparatus 1000 shown in FIG. 18 comprises the image display screen 1010 for displaying an image. It also comprises the image display control section 1020 for switching the image display screen 1010 between displaying an image for viewing (corresponding to image for observation mentioned in the invention) and displaying an image for writing onto the image record medium 1100 onto which an image is written using irritation upon application of light for representing the image. The image record medium 1100 is an optical write record medium onto which a visible image is written upon reception of both irritations of application of light for representing an image and a voltage. The optical write apparatus 1000 switches the image display screen 1010 between displaying an image for viewing and displaying an image for writing. Thus, to write onto the image record medium 1100, the state can be fitted for the photosensitivity, etc., of the image record medium 1100 in such a manner that the brightness and contrast of the image for writing are set higher than those of the image for viewing, for example. The font can also be changed to the easy-to-see size in response to the font size, etc., of the image record medium 1100. Therefore, the display quality of the image written onto the image record medium 1100 can be enhanced.

The optical write apparatus 1000 also comprises a voltage application section (write section) 1030 for applying an image write voltage to the image record medium 1100. It further comprises a timing control section 1040 for adjusting the timing of applying the image write voltage by the voltage application section 1030 and the image display timing for image write on the image display screen 1010 by the image display control section 1020 so that an image for image write is temporarily displayed on the image display screen 1010 only during the time period at least a part of which overlaps the voltage applying time period for writing the image onto the image record medium 1100 by the voltage application section 1030. The image display screen 1010 is thus switched from the image for viewing into the write image at the timing when the voltage is applied, whereby the user's time and labor can be saved as compared with the case where the user switches the display screen with an operation device, etc. Generally, for the image for image write, the light quantity is often increased as compared with that for the image for viewing. In this case, to lessen the power consumption of the optical write apparatus 1000 as much as possible, it is desirable that the time of the image display screen 1010 switched into the image for image write should be shortened. Then, the power consumption of the optical write apparatus 1000 can be lessened by switching from the image for viewing into the image for image write only when the voltage is applied.

The optical write apparatus 1000 also comprises a medium sensor 1050 for sensing that when an image for image write is displayed on the image display screen 1010, the image record medium 1100 is set to the image write position receiving application of light from the displayed image for writing the same visible image as the displayed image, and also for sensing the characteristic of the image record medium 1100. To switch the image display screen 1010 between the image for viewing and the image for image write when the voltage is applied, a device for synchronizing the write voltage application section and the screen display section becomes necessary. However, generally as the voltage application section 1030 is used separately in such a manner that it is attached to the image record medium 1100, the ease of use is provided. In such as case, the image display screen 1010 is not switched between the image for viewing and the image for image write when the voltage is applied, namely, an asynchronous system is adopted. In doing so, the system configuration is simplified and a cost reduction and miniaturization are made possible. The medium sensor 1050 senses that the image record medium 1100 is set to the image write position, and the image display screen 1010 is switched between the image for viewing and the image for image write based on the sense result, whereby the above-mentioned system can be realized.

The optical write apparatus 1000 further comprises a medium move section 1060, when an image for image write is displayed on the image display screen 1010, the medium move section 1060 for causing an image record medium 1300 of a multilayer structure (described later) placed at the image write position receiving application of light from the displayed image for writing the same visible image as the displayed image to make a parallel move relative to the image a distance shorter than the pitch of one pixel of the displayed image on the image display screen 1010. Whenever the medium move section 1060 causes the image record medium 1300 to make a parallel move the image display control section 1020 performs timing control for writing the image.

When an image for image write is displayed on the image display screen 1010, the image record medium 1300 can be moved between the image write position receiving application of light from the displayed image for writing the same visible image as the displayed image and the write image viewing position for the user to view the written visible image. When the image record medium 1300 is at the image write position, the timing control section 1040 performs timing control for writing the image onto the image record medium 1300. Normally, it is difficult to write in a resolution exceeding the resolution of the original image in optical write adopting the image transfer technique. Then, as described in detail below, the image record medium 1300 having a layered structure is a little slid for each layer by the medium move section 1060 and the image is changed to that for a high resolution and then the image is written, whereby the apparent image can be made a higher resolution than the resolution of the original image. This is effective way particularly when a display device, such as TFT, containing a portion transmitting no light, such as wiring or TFT portion, is used as the image display screen 1010.

The optical write apparatus 1000 further comprises an image reception section 1070 for receiving image data. The image display control section 1020 displays an image for viewing and an image for image write on the image display screen 1010 based on the image data received at the image reception section 1070. The optical write apparatus 1000 also comprises a billing data record section 1080 for recording billing data when the image display control section 1020 displays the image for image write on the image display screen 1010 based on the image data received by the image reception section 1070, and a billing data transmission section 1090 for transmitting the billing data recorded by the billing data record section 1080. In doing so, chargeable content can be displayed only at the writing time onto an image record medium, and a content distribution system hard to perform digital processing can be constructed.

Figure 1:
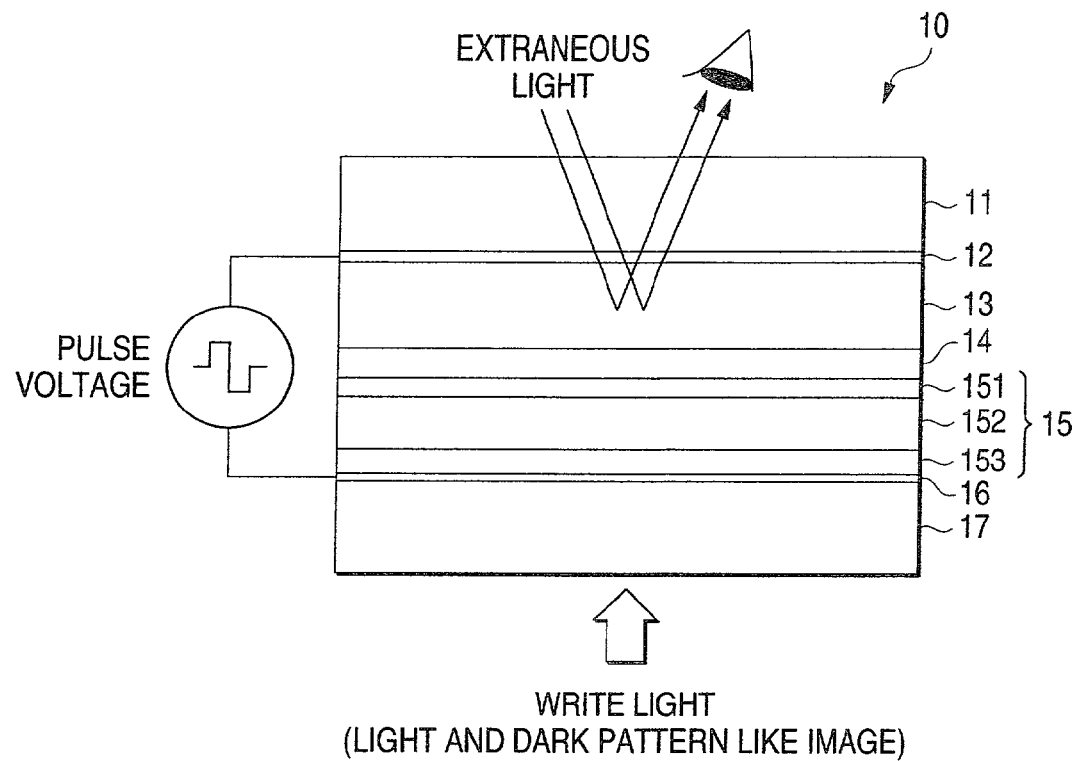
FIG. 1 is a drawing to show the basic configuration of an optical write image record medium.
Figure 2:
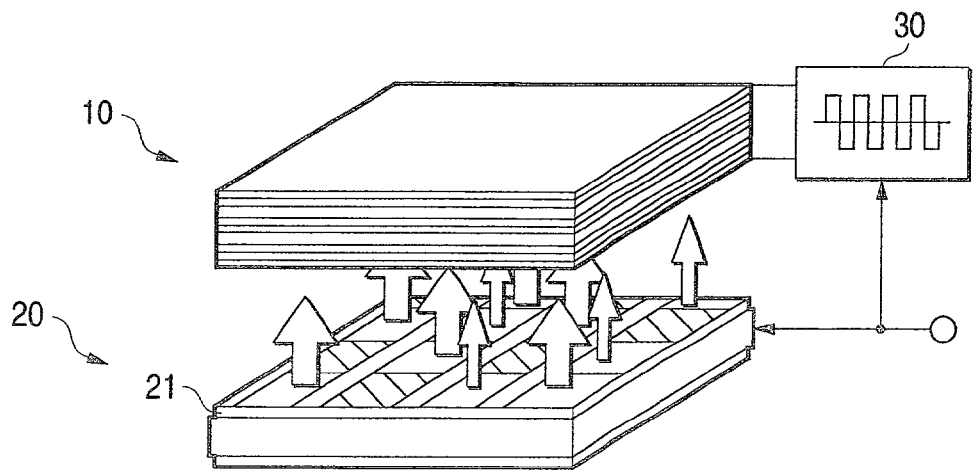
FIG. 2 is a drawing to show write onto the optical write image record medium with a liquid crystal panel.
Figure 3:
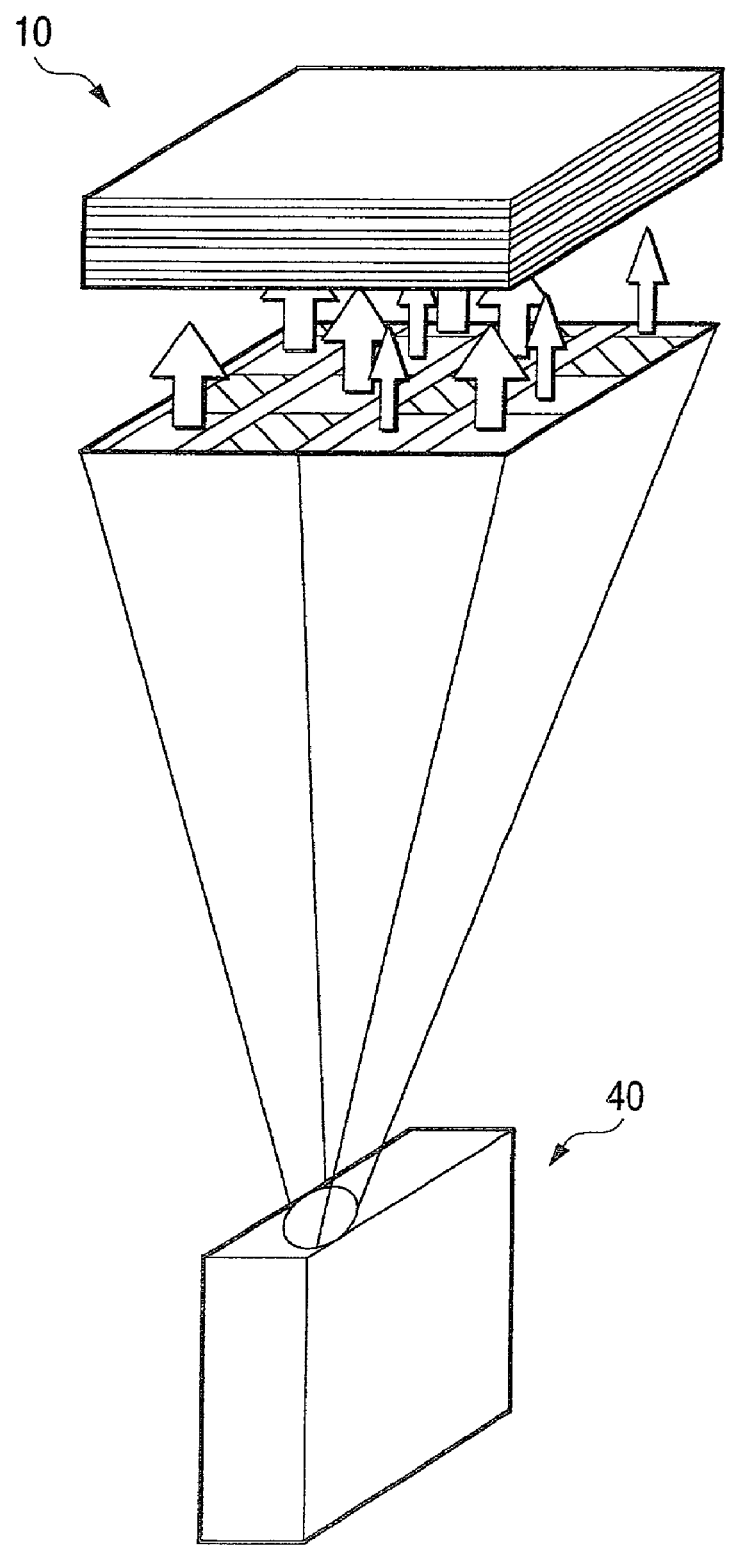
FIG. 3 is a drawing to show write onto the optical write image record medium with a projector.

FIGS. 19(a) and 19(b) are drawings to show the image display screen shown in FIG. 1.

FIG. 19(a) shows the image display screen 1010 of a display device 1002 forming a part of the optical write apparatus 1000. An image for viewing 1010a is displayed on the image display screen 1010. The display device 1002 is provided with an operation device group 1002a. On the other hand, FIG. 19(b) shows the image display screen 1010 switched into an image for image write 1010b as the operation device group 1002a is operated. The image record medium 1100 held on a hinge part 1003 provided at an end of the display device 1002 is also shown. A visible image 1100a provided by writing (transferring) the image for image write 1010b is shown on the image record medium 1100.

To write the visible image 1100a onto the image record medium 1100, the user operates the operation device group 1002a to switch the image display screen 1010 from the image for viewing 1010a to the image for image write 1010b. For example, the brightness and contrast of the image for image write 1010b are set higher than those of the image for viewing 1010a and assuming that the visible image 1100a is written onto the image record medium 1100, the font is changed to the easy-to-see font size. The state is thus fitted for the photosensitivity, etc., of the image record medium 1100 and then the visible image 1100a is written onto the image record medium 1100.

The display characteristics changed matching the characteristics of the image record medium 1100 include the screen light amount, display speed, display timing (interlace, progressive sequence, etc.,), density, gradation, gradation representation method, the number of colors, tint, display size, reflectivity, font size, image orientation, negative-positive inversion, multiple image display of 2-up, 4-up, etc., and the like. As a specific example, if the image display screen 1010 produces display with a multiple-step gradation although the image record medium 1100 is in a binary mode, the appearance of a density image in the binary or threshold vicinity, of the visible image 1100a on the image record medium 1100 worsens. Then, to make the visible image 1100a on the image record medium 1100 easy to see, binarization is executed before writing. At the time, the binary level is matched with the fine characteristics of the image record medium 1100, whereby an easier-to-see image can be provided. Alternatively, the multiple-step gradation technique of the image is changed from the density technique to area gradation technique, so that an image fitted for the image record medium 1100 can be formed. The display quality of the image record medium 1100 can be thus improved.

Figure 20:
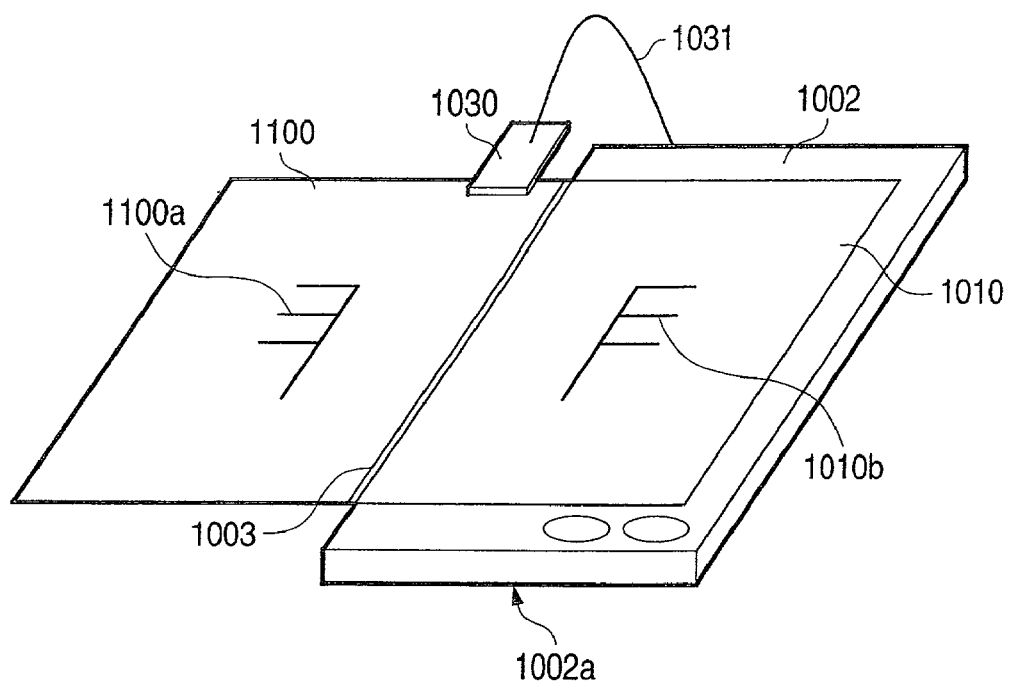
FIG. 20 is a drawing to show how the image display screen is switched between an image for viewing and an image for image write over a signal line when a voltage is applied.

FIG. 20 is a drawing to show how the image display screen is switched between an image for viewing and an image for image write over a signal line when a voltage is applied.

FIG. 20 shows the voltage application section 1030 (see FIG. 18) and a synchronous signal line 1031 in addition to the image display screen 1010, the image record medium 1100, and the hinge part 1003 shown in FIG. 19. The voltage application section 1030 is attached to the image record medium 1100. The voltage application section 1030 and the image display screen 1010 are connected by the synchronous signal line 1031. Here, the timing control section 1040 adjusts the timing of applying the image write voltage by the voltage application section 1030 and the image display timing for image write on the image display screen 1010 by the image display control section 1020 shown in FIG. 18 so that an image for image write is temporarily displayed on the image display screen 1010 only during the time period at least a part of which overlaps the voltage applying time period for writing the image onto the image record medium 1100 by the voltage application section 1030, and the image display screen 1010 and the voltage application section 1030 communicate with each other over the synchronous signal line 1031. Thus, to write onto the image record medium 1100, the image display screen 1010 is automatically switched from the image for viewing 1010a to the image for image write 1010b only when the voltage is applied. This eliminates the need for the user to switch the image display screen 1010 and makes it possible to improve the display quality of the image record medium 1100 (reflectivity, contrast, font size, etc.,).

Generally, for the image for image write 1010b, the light quantity is often increased as compared with that for the image for viewing 1010a. In this case, power consumption is also increased. Then, to lessen the power consumption of the optical write apparatus 1000 as much as possible, it is desirable that the time of the image display screen 1010 switched into the image for image write 1010b should be shortened. Here, the power consumption can be lessened by switching from the image for viewing 1010a into the image for image write 1010b only when the voltage is applied.

Figure 21:
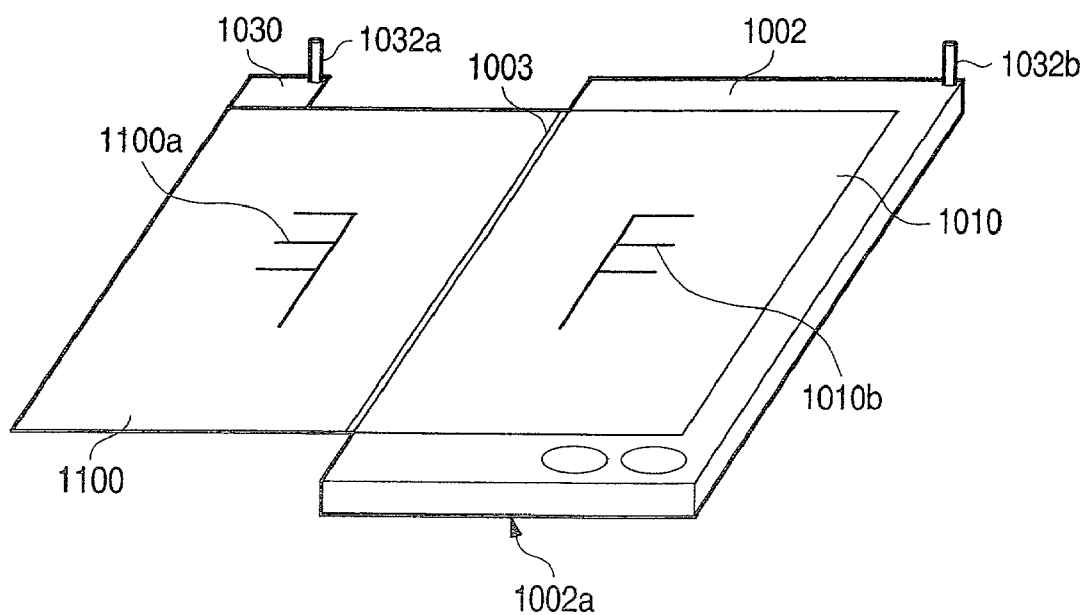
FIG. 21 is a drawing to show how the image display screen is switched between an image for viewing and an image for image write by radio when a voltage is applied.

FIG. 21 is a drawing to show how the image display screen is switched between an image for viewing and an image for image write by radio when a voltage is applied.

FIG. 21 shows a radio section 1032a provided on the voltage application section 1030 attached to the image record medium 1100 and a radio section 1030b provided on the display device 1002. The image display screen 1010 may be automatically switched from the image for viewing 1010a to the image for image write 1010b through the radio sections 1032a and 1032b only when the voltage is applied.

Figure 22:
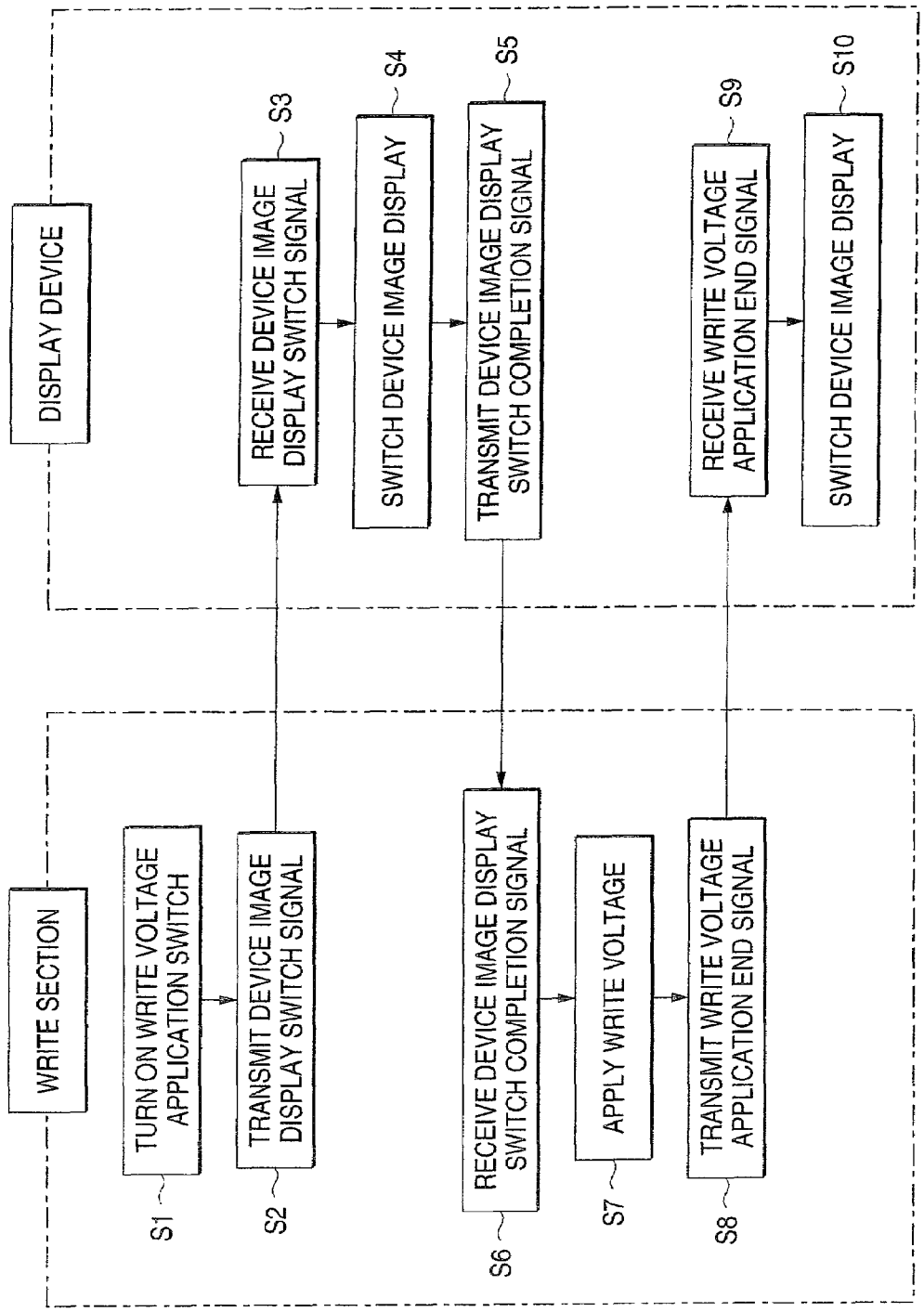
FIG. 22 is a sequence chart of a program for image switching by radio.

FIG. 22 is a sequence chart of a program for image switching by radio.

In the initial point in time, the image display screen 1010 displays the image for viewing 1010a. It is assumed that the image record medium 1100 is overlapped on the image display screen 1010. First, at step S1, the user turns on a write voltage application switch (not shown) and the sequence process proceeds to step S2. At step S2, a device image display switch signal is transmitted from the radio section 1032a provided on the voltage application section 1030 of the write section.

At step S3, the device image display switch signal is received at the radio section 1032b and the sequence process proceeds to step S4. At step S4, the image display screen 1010 is switched from the image for viewing 1010a to the image for image write 1010b by the device image switch signal. Further, at step S5, a device image display switch completion signal indicating that the image display screen 1010 has been switched to the image for image write 1010b is transmitted from the radio section 1032b.

At step S6, the device image display switch completion signal transmitted from the radio section 1032b is received at the radio section 1032a. Further, at step S7, the voltage application section 1030 applies a write voltage to the image record medium 1100. Then, the sequence process proceeds to step S8 and a write voltage application end signal is transmitted from the radio section 1032a.

At step S9, the write voltage application end signal is received at the radio section 1032b and the sequence process proceeds to step S10. At step S10, the image display screen 1010 is switched to the image for viewing 1010a and the sequence is terminated.

Figure 23:
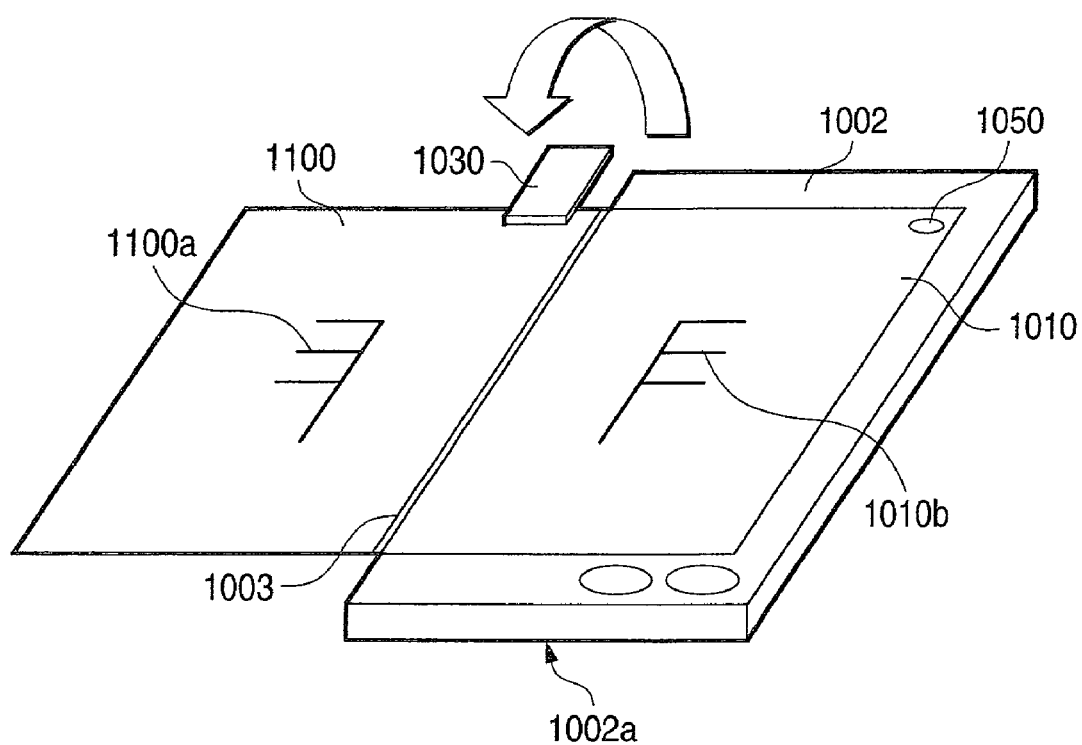
FIG. 23 is a drawing to show how the image display screen is switched between an image for viewing and an image for image write when an image record medium is set on the image display screen.

FIG. 23 is a drawing to show how the image display screen is switched between an image for viewing and an image for image write when an image record medium is set on the image display screen.

FIG. 23 shows the medium sensor 1050 for sensing that when an image for image write 1010b is displayed on the image display screen 1010, the image record medium 1100 is set to the image write position receiving application of light from the displayed image 1010b for writing the same visible image as the displayed image 1010b, and also for sensing the characteristic of the image record medium 1100. Here, the voltage application section 1030 is attached to the image record medium 1100, the medium sensor 1050 senses that the image record medium 1100 is set to the image write position, and the image display screen 1010 is switched between the image for viewing 1010a and the image for image write 1010b based on the sense result. In doing so, the configuration is simplified and a cost reduction and miniaturization are made possible as compared with the case where the image display screen 1010 is switched between the image for viewing 1010*a* and the image for image write 1010*b* when the voltage is applied by synchronizing the write voltage application section and the screen display section.

Figure 24:
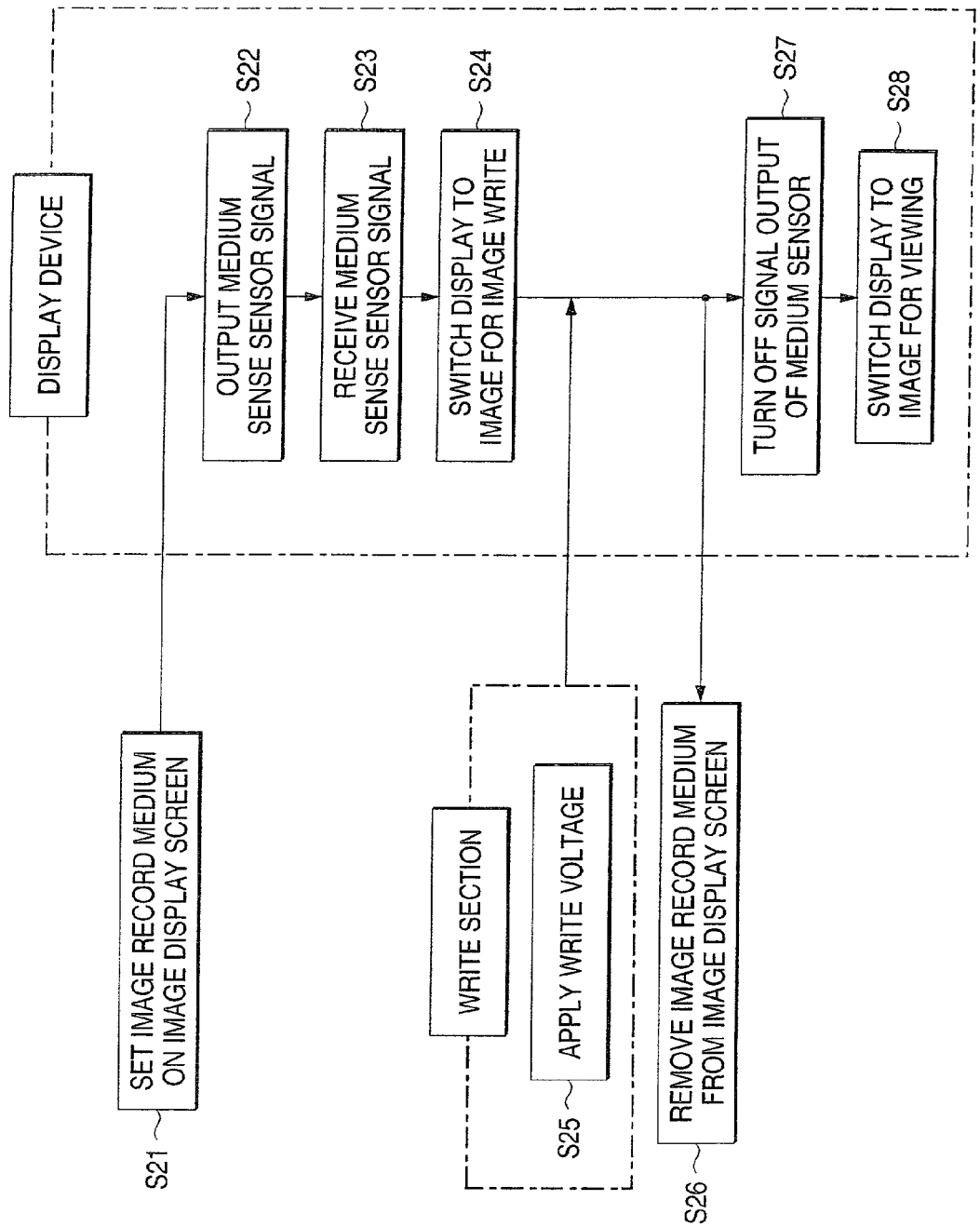
FIG. 24 is a sequence chart of a program for image switching based on the sense result of a medium sensor shown in FIG. 23.

FIG. 24 is a sequence chart of a program for image switching based on the sense result of the medium sensor shown in FIG. 23.

To being with, at step S21, the image record medium 1100 is set on the image display screen 1010. Next, at step S22, the medium sensor 1050 senses that the image record medium 1100 is set on the image display screen 1010, and outputs a medium sensor signal. Further, the sequence process proceeds to step S23 and the medium sensor signal is received at the image display control section 1020 through the timing control section 1040. Then, the sequence process proceeds to step S24 at which the image display screen 1010 is switched to the image for image write 1010*b*. At step S25, a write signal is applied from the voltage application section 1030 to the image record medium 1100. Upon completion of writing as the write voltage is applied, at step S26, the image record medium 1100 is removed from on the image display screen 1010. Further, at step S27, the medium sensor signal of the medium sensor 1050 is turned off and the sequence process proceeds to step S28. At step S28, the image display screen 1010 is switched to the image for viewing 1010*a* and the sequence is terminated.

Figure 25:
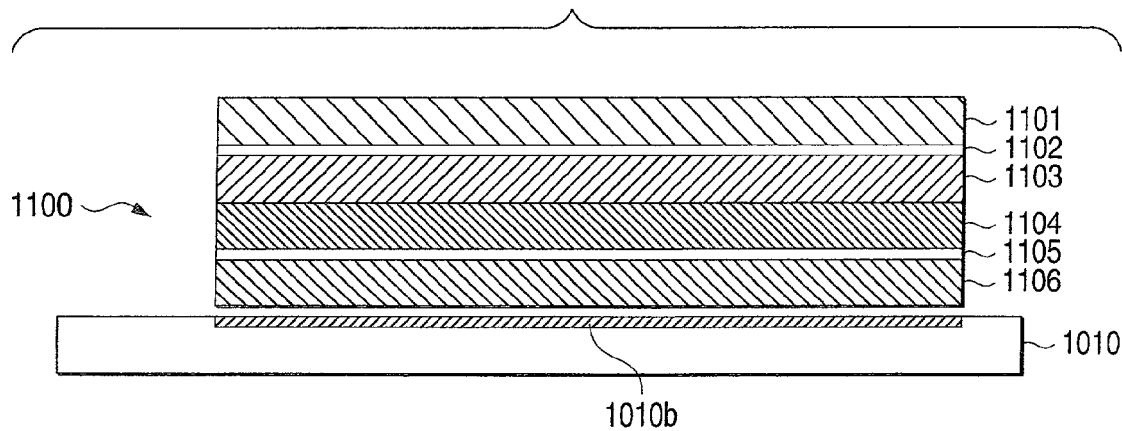
FIG. 25 is a sectional view to show the structure of the image record medium.

FIG. 25 is a sectional view to show the structure of the image record medium.

In FIG. 25, the image record medium 1100 is placed on the image display screen 1010 on which the image for image write 1010*b* of a light emission image pattern is formed. The image record medium 1100 has a structure wherein a base substrate 1101, a transparent electrode 1102, a reflectivity change element 1103, a photoconductor layer 1104, a transparent electrode 1105, and a base substrate 1106 are deposited on each other in order from top to bottom. Generally, as an image record medium, a medium (device) with the display reflectivity changed by the voltage of a voltage distribution pattern to which the light quantity pattern represented by the image 1010*b* on the image display screen 1010 is changed using change in the resistance value based on the photoconductor layer 1104 is preferred like the image record medium 1100. Such a structure eliminates the need for a minute pattern forming electrodes as compared with an image record medium of self-write type, and thus the manufacturing cost can be reduced.

Figure 26:
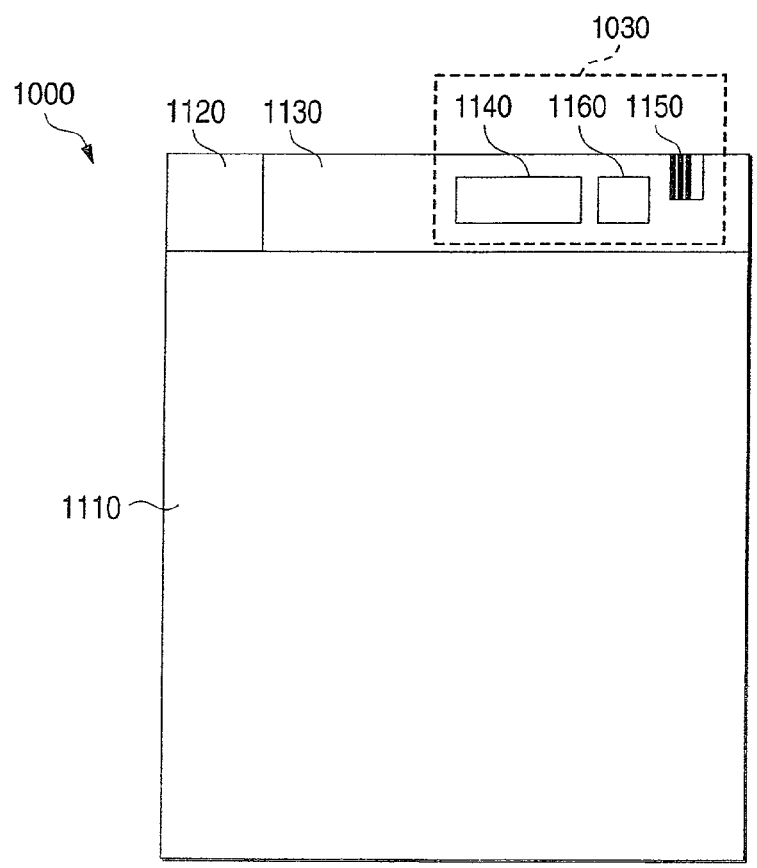
FIG. 26 is a drawing to show areas of the image record medium.

FIG. 26 is a drawing to show areas of the image record medium.

The image record medium 1100 shown in FIG. 26 comprises an analog information rewritable area 1110 where the image for image write 1010*b* is displayed, a medium characteristic sense area 1120 sensed by the medium sensor 1050, and an unwritable area 1130 where write is impossible at the image write time (image transfer time). The unwritable area 1130 is provided with a digital information writable area 1140. If a plurality of types of image record media 1100 become available, the types of image record media 1100 need to be recognized. Then, an identification marking (symbol or barcode) 1150 is put on a part of the unwritable area 1130 or internal memory 1160 is provided for recording necessary information therein. As the internal memory 1160, normal IC memory may be used or the memory property of the image record medium 1100 itself may be used to record information thereon. Further, if the model of the optical write apparatus 1000 cannot be identified, the voltage application section 1030 is provided with a sensor (not shown) for sensing the display state of the image display screen 1010 of the optical write apparatus 1000, so that the display image can be adjusted. An image is once written on to the image record medium 1100 and the written image is input to the sensor and is fed back, thereby finally switching to the image for image write. In any case, the function and the sensor for reading the information are built in the voltage application section 1030. Thus, to switch the image display screen 1010 from the image for viewing 1010*a* to the image for image write 1010*b*, information of the size, the sensitivity, etc., of the image record medium 1100 becomes necessary. The information is recorded on the image record medium 1100, whereby if the type of image record medium 1100 is changed, it is made possible to change to a proper image for image write 1010*b* for writing the corresponding image.

Next, the sequence of a program for writing an image onto the image record medium will be discussed.

Figure 27:
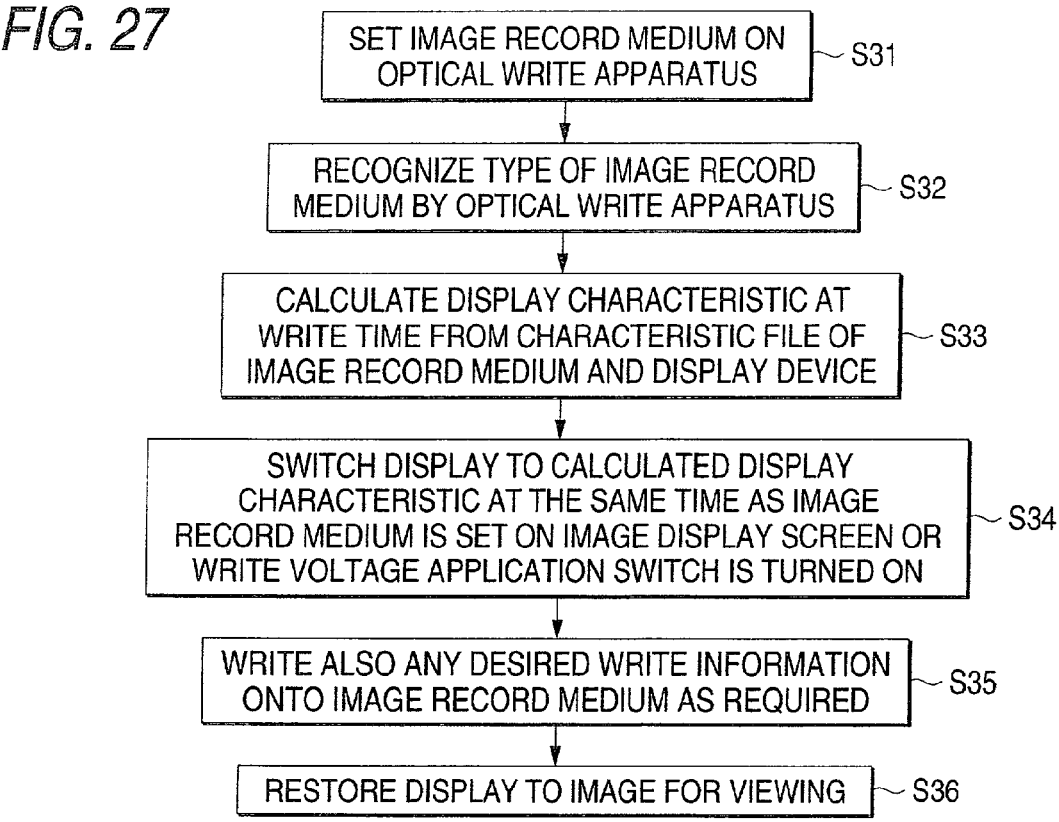
FIG. 27 is a sequence chart of a program for writing an image onto the image record medium matching the characteristics of the image record medium.

FIG. 27 is a sequence chart of the program for writing an image onto the image record medium matching the characteristics of the image record medium.

To begin with, at step S31, the image record medium 1100 is set on the optical write apparatus 1000. Next, at step S32, the optical write apparatus 1000 recognizes the type of image record medium 1100. Further, at step S33, the display characteristic at the write time is calculated from the characteristic file of the image record medium 1100 and the display device 1002 forming a part of the optical write apparatus 1000, and the sequence process proceeds to step S34.

At step S34, the image display screen 1010 is switched to the calculated display characteristic at the same time as the image record medium 1100 is set on the image display screen 1010 or the write voltage application switch is turned on. At step S35, any desired write information is also written onto the image record medium 1100 as required. Further, at step S36, the image display screen 1010 is switched to the image for viewing 1010*a* and the sequence is terminated.

Figure 28:
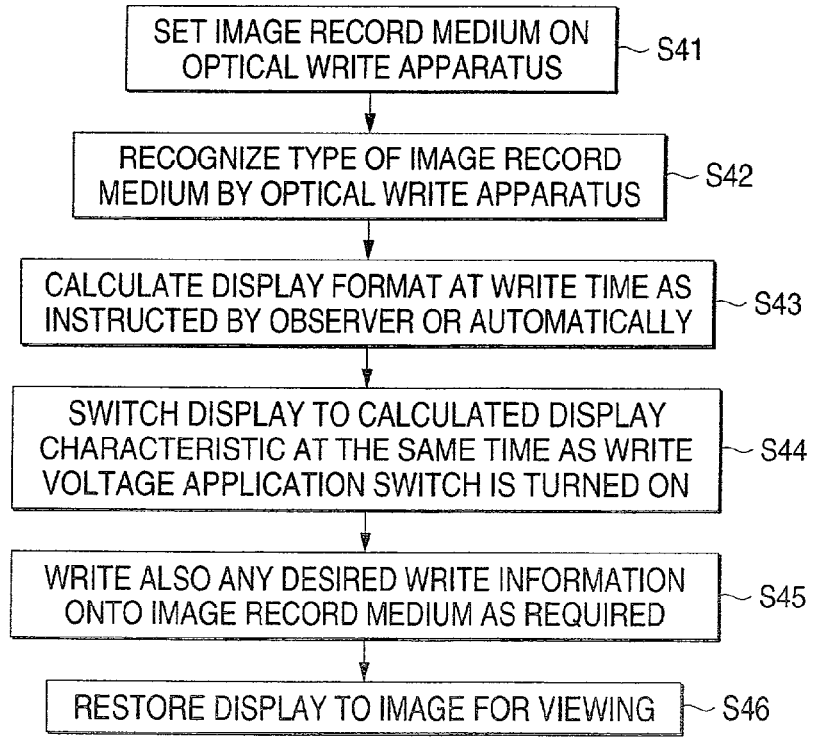
FIG. 28 is a sequence chart of a program for writing an image onto the image record medium matching the characteristics of the image for viewing.

FIG. 28 is a sequence chart of a program for writing an image onto the image record medium matching the characteristics of the image for viewing.

To begin with, at step S41, the image record medium 1100 is set on the optical write apparatus 1000. Next, at step S42, the optical write apparatus 1000 recognizes the type of image record medium 1100. Further, at step S43, the display format at the write time is calculated as instructed by the viewer or automatically, and the sequence process proceeds to step S44.

At step S44, the image display screen 1010 is switched to the calculated display characteristic at the same time as the write voltage application switch is turned on. At step S45, any desired write information is also written onto the image record medium 1100 as required. Further, at step S46, the image display screen 1010 is switched to the image for viewing 1010*a* and the sequence is terminated.

Figure 29:
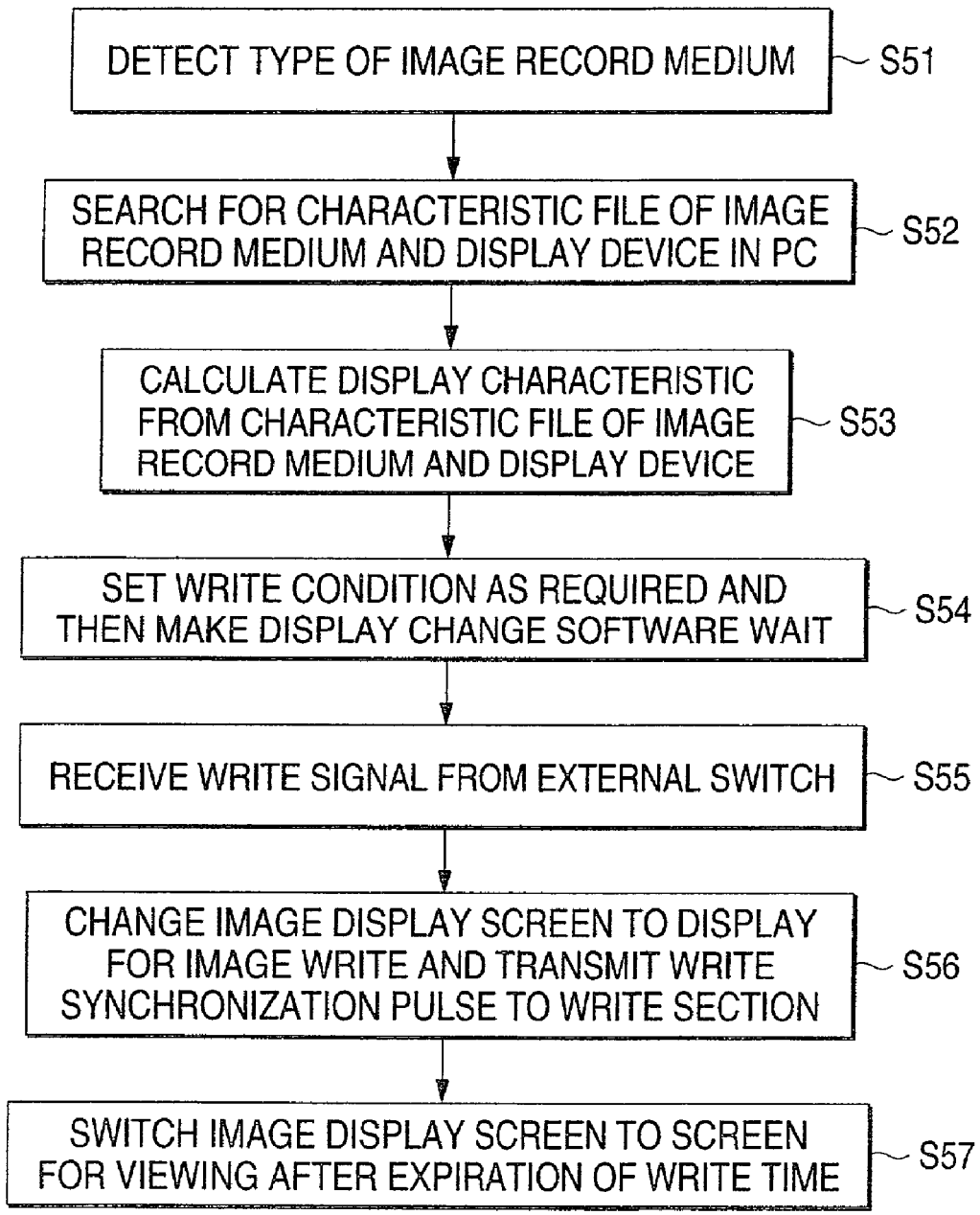
FIG. 29 is a sequence chart of a program for writing an image of a personal computer (PC) onto the image record medium if a display device is PC.

FIG. 29 is a sequence chart of a program for writing an image of a personal computer (PC) onto the image record medium if the display device is PC.

To begin with, at step S51, the optical write apparatus 1000 recognizes the type of image record medium 1100. Next, at step S52, a search is made for the characteristic file of the image record medium 1100 and the display device in the PC. Further, at step S53, the display characteristic is calculated from the characteristic file of the image record medium 1100 and the display device and the sequence process proceeds to step S54.

At step S54, a write condition is set as required and then display change software is made to wait. At step S55, a write signal is received from an external switch (not shown) Further, at step S56, the image display screen 1010 is changed to display for image write and a write synchronization pulse is transmitted to the write section (voltage application section 1030). Next, at step S57, the image display screen 1010 is switched to the image for viewing 1010*a* after the expiration of the write time and the sequence is terminated. If the display device has the calculation function like a PC, the PC is thus provided with the image adjustment function, whereby the functions of the optical write apparatus 1000 can be decreased.

Figure 30:
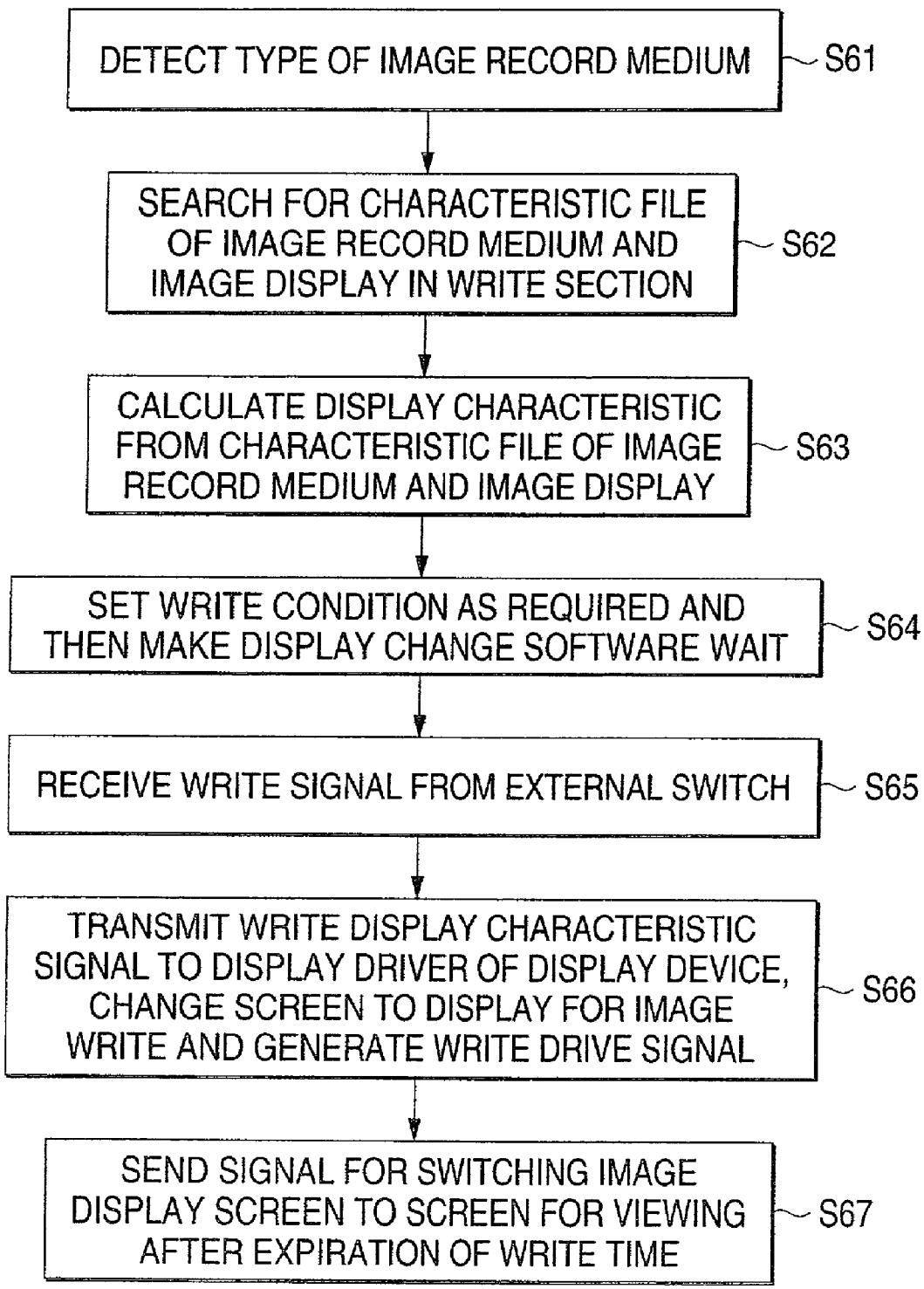
FIG. 30 is a sequence chart of a program for writing an image of a display device onto the image record medium if the display device has no calculation function.

FIG. 30 is a sequence chart of a program for writing an image of a display device onto the image record medium if the display device has no calculation function.

To begin with, at step S61, the write section recognizes the type of image record medium 1100. Next, at step S62, a search is made for the characteristic file of the image record medium 1100 and the display device 1002 in the optical write apparatus 1000. Further, at step S63, the display characteristic is calculated from the characteristic file of the image record medium 1100 and the display device 1002.

At step S64, a write condition is set as required and then display change software is made to wait. At step S65, a write signal is received from an external switch (not shown). Further, at step S66, a write display characteristic signal is transmitted to the display driver of the display device 1002, the screen is changed to display for image write, and a write drive signal is generated. Next, at step S67, a signal is sent for switching the image display screen 1010 to the image for viewing 1010*a* after the expiration of the write time and the sequence is terminated. To thus use the display device 1002 which has no calculation function or cannot change the image characteristic, the write section is provided with the calculation function and the voltage waveform of the write signal is changed.

Figure 31:
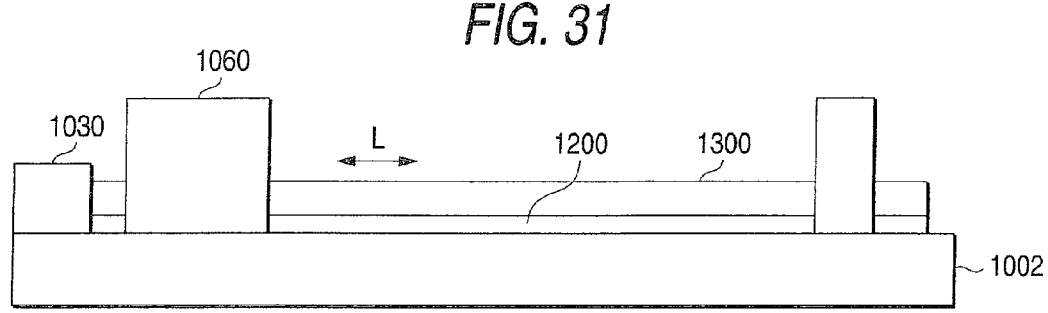
FIG. 31 is a sectional view of the medium move section shown in FIG. 18.

FIG. 31 is a sectional view of the medium move section shown in FIG. 18.

FIG. 31 shows the medium move section 1060 placed on the display device 1002 such as an EL panel. An image formation optical sheet 1200 for limiting the light application area and focusing is also placed on the display device 1002 and the image record medium 1300 having a multilayer structure (described later) is placed on the image formation optical sheet 1200. The voltage application section 1030 is attached to the image record medium 1300. The medium move section 1060 causes the image record medium 1300 to make a parallel move relative to the image a distance L shorter than the pitch of one pixel of the image displayed on the image display screen 1010 of the display device 1002 (1/n pitch).

Figure 32:
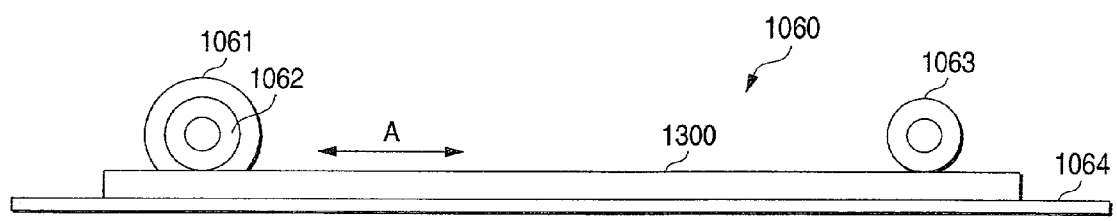
FIG. 32 is a drawing to show the structure of the medium move section shown in FIG. 31.

FIG. 32 is a drawing to show the structure of the medium move section shown in FIG. 31.

The medium move section 1060 comprises a stepping motor 1061, a drive rubber roll 1062, a support rubber roll 1063, and a support slide rail 1064. The image record medium 1300 is placed on the support slide rail 1064 and is moved freely in the A direction by the drive rubber roll 1062 through the stepping motor 1061 while it is supported on the support rubber roll 1063.

Figure 33:
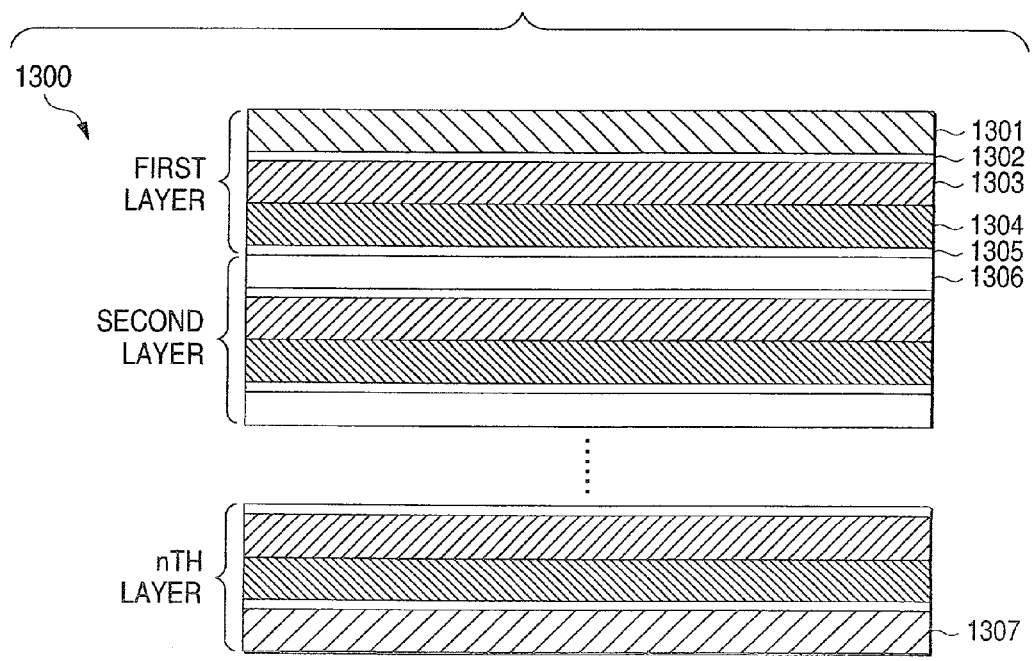
FIG. 33 is a sectional view of an image record medium having a multilayer structure.

FIG. 33 is a sectional view of the image record medium having a multilayer structure.

The image record medium 1300 comprises a top base substrate 1301 and a bottom base substrate 1307 and N layers deposited on each other between the base substrates 1301 and 1307, each layer consisting of a transparent electrode 1302, a reflectivity change element 1303, a photoconductor layer 1304, a transparent electrode 1305, and an insulating layer 1306.

Normally, it is difficult to write in a resolution exceeding the resolution of the original image in optical write adopting the image transfer technique, as described above. Then, while the image record medium 1300 is a little slid for each layer by the medium move section 1060 and the image is changed to that for a high resolution, the image is written, whereby the apparent image can be made a higher resolution than the resolution of the original image.

Figure 34:
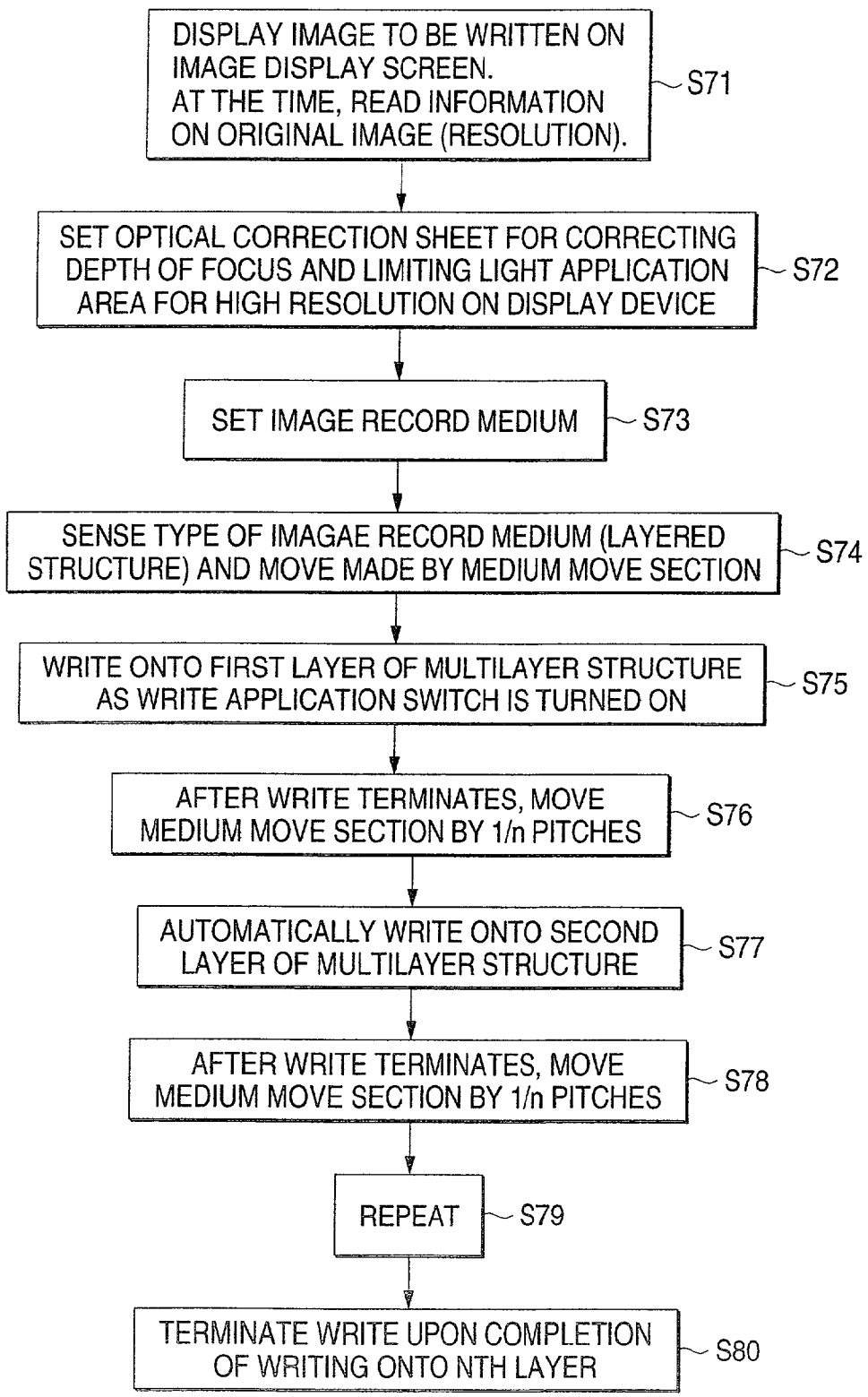
FIG. 34 is a sequence chart of a program for executing optical write onto the image record medium shown in FIG. 33 in a high resolution.

FIG. 34 is a sequence chart of a program for executing optical write onto the image record medium shown in FIG. 33 in a high resolution.

To begin with, at step S71, the image to be written is displayed on the image display screen 1010. At the time, the information on the original image (resolution) is read. Next, at step S72, optical correction sheet (image formation optical sheet 1200) for correcting the depth of focus and limiting the light application area for a high resolution is set on the display device 1002. Further, at step S73, the image record medium 1300 is set.

Next, the sequence process proceeds to step S74 and the type of image record medium 1300 (layered structure) and a move made by the medium move section 1060 are sensed by a sensor (not shown). At step S75, write onto the first layer of the multilayer structure is executed as a write application switch is turned on. Further, at step S76, after the write onto the first layer terminates, the medium move section 1060 is moved by 1/n pitches. Next, at step S77, automatically write onto the second layer of the multilayer structure is executed. At step S78, after the write onto the second layer terminates, the medium move section 1060 is moved by 1/n pitches. At step S79, writing onto the third to Nth layers is repeated as described above. At step S80, at the termination of writing onto the Nth layer, the sequence is terminated. Generally, light does not pass through wiring or TFT portion of the image record medium of a multilayer structure and thus the write position is slid and write is executed two or more times (here, N times), so that the apparent resolution can be raised. Here, the medium move section 1060 comprising the stepping motor 1061, the drive rubber roll 1062, the support rubber roll 1063, and the support slide rail 1064 has been described as the section for moving the image record medium 1300; in addition, image record medium 1300 may be moved by a medium move section using a solenoid or a vibration device.

Figure 35:
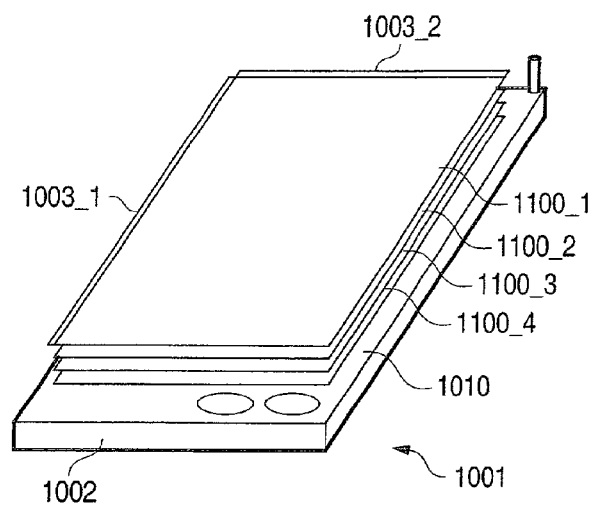
FIG. 35 is a drawing to show a state in which four image record media are placed on the optical write apparatus in a fold state.
Figure 36:
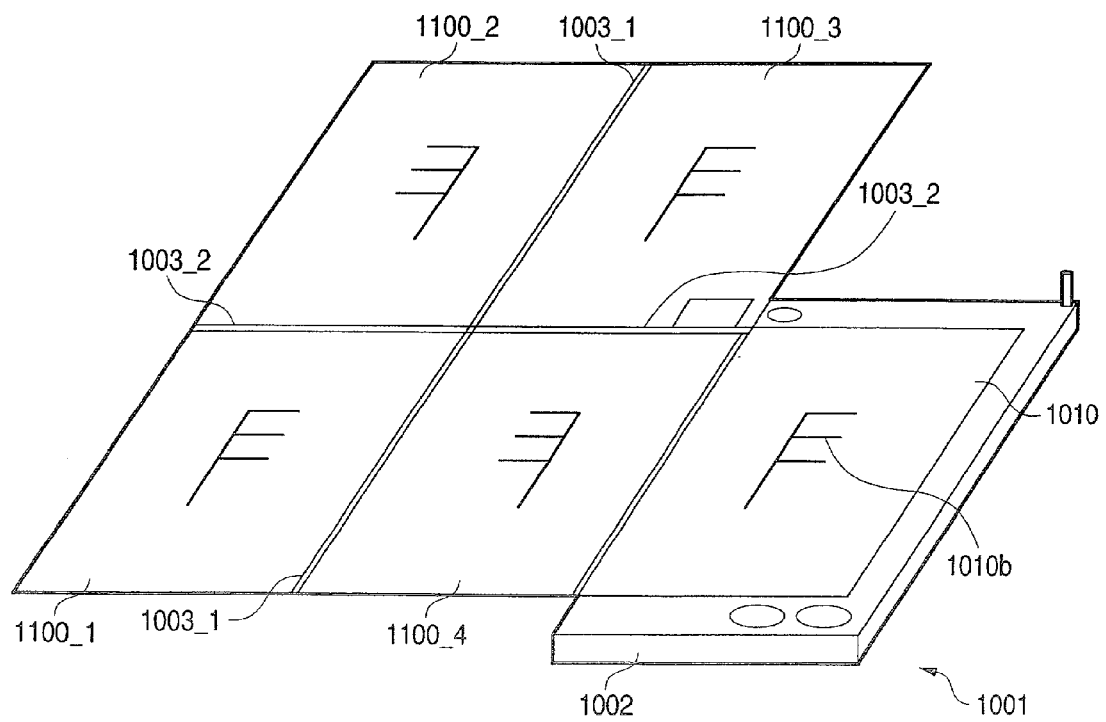
FIG. 36 is a drawing to show a state in which the four image record media shown in FIG. 35 are spread.

FIG. 35 is a drawing to show a state in which four image record media are placed on the optical write apparatus in a fold state. FIG. 36 is a drawing to show a state in which the four image record media shown in FIG. 35 are spread.

In FIG. 35, four image record media 1100_1, 1100_2, 1100_3, and 1100_4 are placed on the image display screen 1010 of the display device 1002 forming a part of the optical write apparatus 1000 in a fold state. These four image record media 1100_1, 1100_2, 1100_3, and 1100_4 are held on hinge parts 1003_1 and 1003_2 having a fold function. On the other hand, in FIG. 36, the four image record media 1100_1, 1100_2, 1100_3, and 1100_4 are spread through the hinge parts 1003_1 and 1003_2, providing a large screen. Thus, the image record media 1100_1, 1100_2, 1100_3, and 1100_4 can provide large-screen display through the hinge parts 1003_1 and 1003_2 and can be folded at the hinge parts 1003_1 and 1003_2 for reduction to a quarter size, so that portability can be enhanced. To write images onto the four image record media 1100_1, 1100_2, 1100_3, and 1100_4, the image can be written onto the image record media 1100_1, 1100_2, 1100_3, and 1100_4 in order in the fold state. In the fold state, viewed from the display device 1020, the light quantity of the fourth image record medium 1100_4 becomes lower than that of the first image record medium 1100_1. Thus, it is necessary to optimize the display characteristics of the light quantity of write, etc., for each of the image record media 1100_1, 1100_2, 1100_3, and 1100_4.

If such a fold mode is adopted, unless the display orientation is changed for each of the image record media 1100_1, 1100_2, 1100_3, and 1100_4, one image cannot be formed when the image record media are unfolded. Then, the image orientation and the display characteristic are changed at the timing of writing onto each of the image record media 1100_1, 1100_2, 1100_3, and 1100_4 and image conversion is executed for writing the images, whereby large-screen batch display impossible only with the display device 1002 is made possible.

Figure 37:
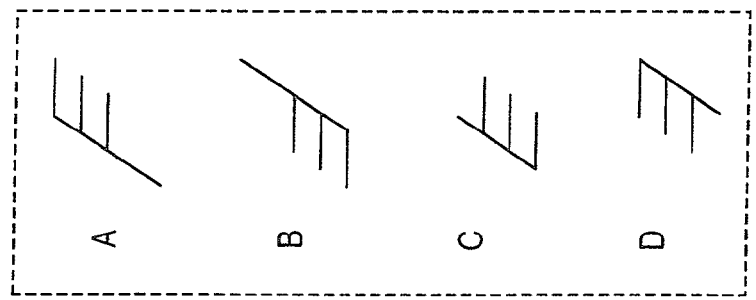
FIG. 37 is a drawing to show a state in which the four image record media shown in FIG. 36 are displayed in batch after image conversion is executed.
Figure 37:
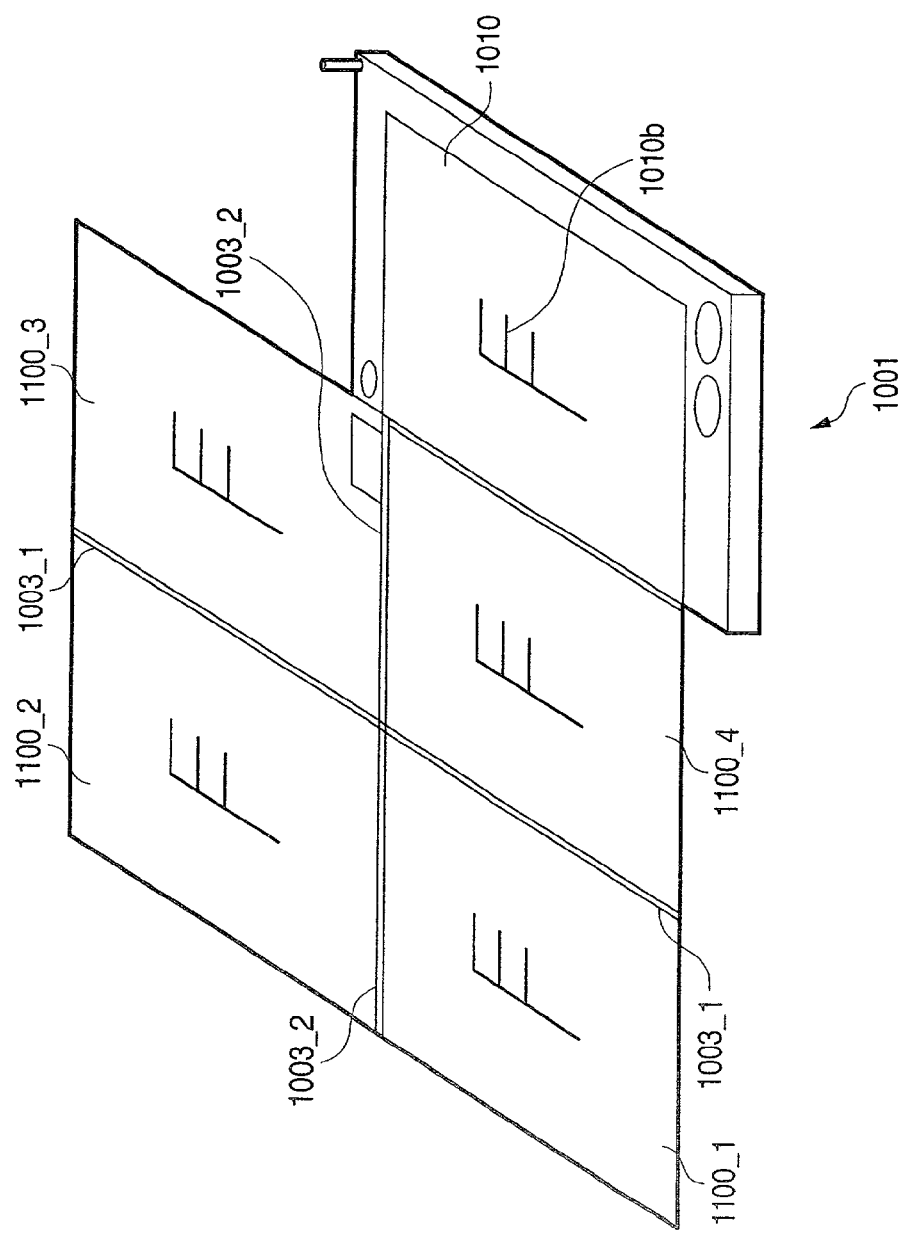

FIG. 37 is a drawing to show a state in which the four image record media shown in FIG. 36 are displayed in batch after image conversion is executed.

FIG. 37(*a*) shows a batch-displayed large screen consisting of the four image record media 1100_1, 1100_2, 1100_3, and 1100_4. On the other hand, FIG. 37(*b*) shows write images A, B, C, and D to realize the image record media 1100_1, 1100_2, 1100_3, and 1100_4. The optical write apparatus 1000 executes conversion to such images A, B, C, and D and writes the images A, B, C, and D onto the image record media 1100_1, 1100_2, 1100_3, and 1100_4, thereby providing the images in the orientations fitted for viewing in the spread state. Thus, a large screen can be viewed.

Figure 38:
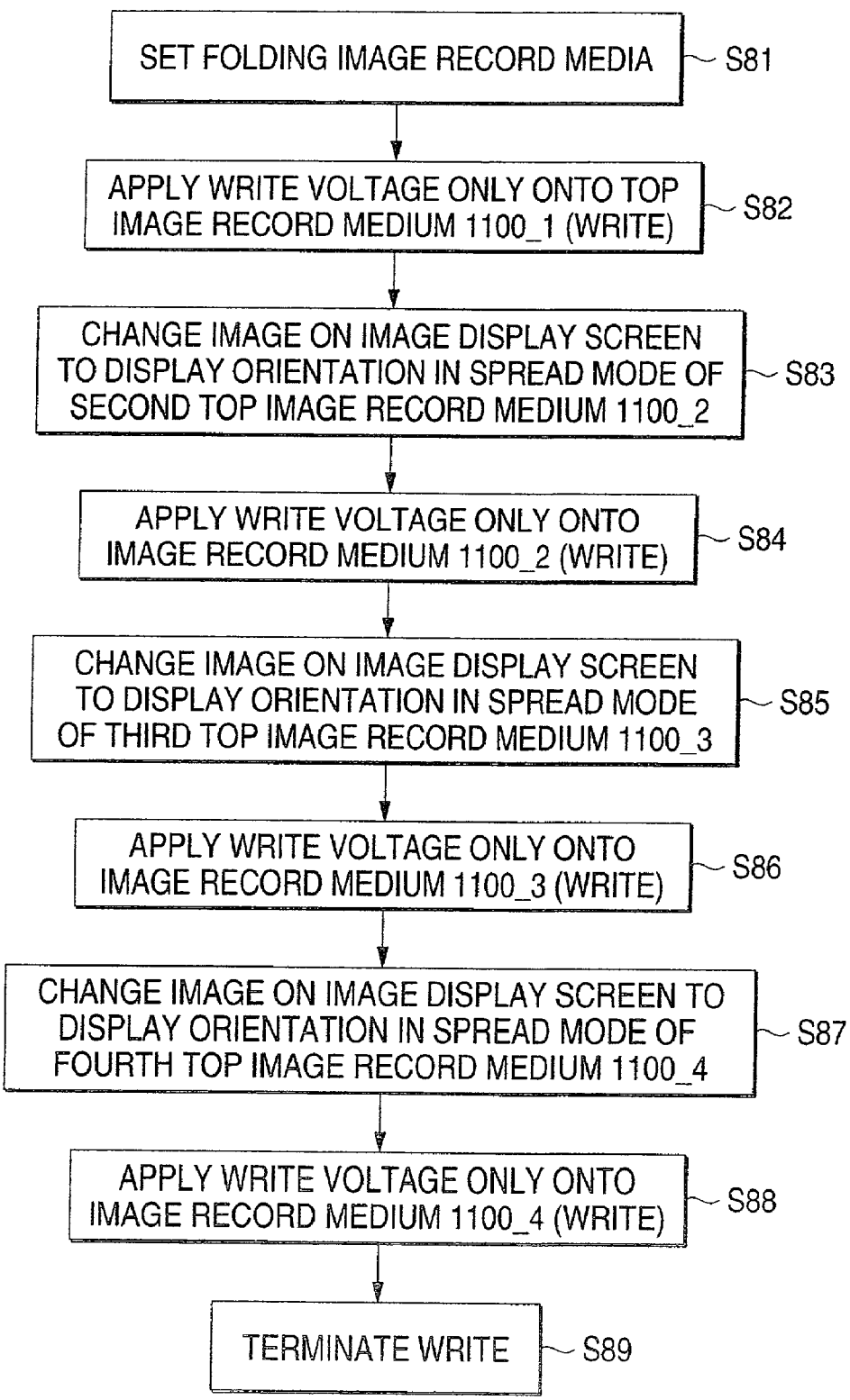
FIG. 38 is a sequence chart of a program for providing the batch-displayed large screen consisting of the four image record media shown in FIG. 37.

FIG. 38 is a sequence chart of a program for providing the batch-displayed large screen consisting of the four image record media shown in FIG. 37.

To begin with, at step S81, the folding image record media 1100_1, 1100_2, 1100_3, and 1100_4 are set. Next, at step S82, a write voltage is applied only onto the top image record medium 1100_1. Further, at step S83, the image on the image display screen 1010 is changed to the display orientation in the spread mode of the second top image record medium 1100_2. At step S84, a write voltage is applied only onto the image record medium 1100_2.

Further, at step S85, the image on the image display screen 1010 is changed to the display orientation in the spread mode of the third top image record medium 1100_3. At step S86, a write voltage is applied only onto the image record medium 1100_3.

Next, at step S87, the image on the image display screen 1010 is changed to the display orientation in the spread mode of the fourth top image record medium 1100_4. Further, at step S88, a write voltage is applied only onto the image record medium 1100_4. Then, at step S89, the write operation is terminated and the sequence is terminated. In the description, the number of image record media is four, but a larger number of image record media may be adopted. At the time, a larger number of image record media can also share one write section.

As a business application example, application to digital content is possible. Distribution of analog record media based on printing on paper represented by newspapers, magazines, and books involves a problem of incurring the distribution cost and taking time because paper is distributed. In contrast, an attempt is made to send digital information directly to the user in electronic distribution; however, viewing a newspaper, a magazine, or a book on a PC is not comfortable for the user and the originating party also needs to conduct security against risks of re-distribution and secondary use of digital content and widespread use is hindered. On the other hand, FAX or paper printing leads to paper consumption and discard after use, hindering introduction into homes.

Then, use of the above-described rewritable image record media as a viewing method makes it possible to provide the merits of the low cost and speed of digital distribution, avoid the secondary use because digital processing is hard to perform at the user's viewing stage, and realize the viewing environment of consuming no paper at the same time by adopting digital distribution and viewing on image record media after analog conversion. A digital-analog content distribution system as a business flow will be discussed with reference to FIG. 39.

Figure 39:
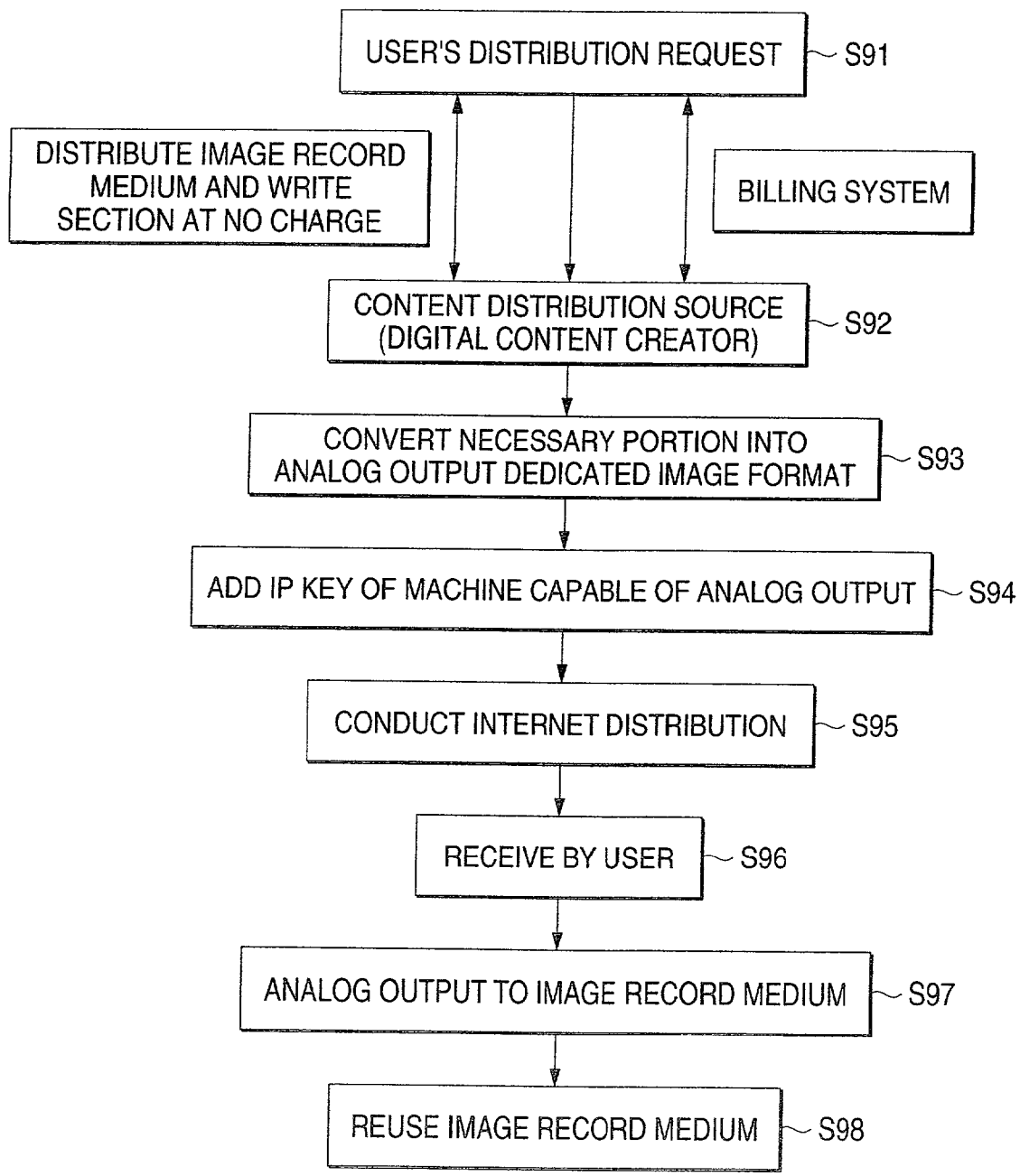
FIG. 39 is a sequence chart of a program of a digital-analog content distribution system.

FIG. 39 is a sequence chart of a program of the digital-analog content distribution system.

Here, an image record medium and a write section are distributed at no charge from the content distribution source to the user. A billing system is constructed between the user and the content distribution source. The user receives any desired image data at the image reception section 1070 shown in FIG. 1 from the content distribution source and when the desired image is displayed, the billing data is recorded in the billing data record section 1080 and the recorded billing data is transmitted from the billing data transmission section 1090 to the content distribution source.

To being with, a user's distribution request (step S91) is sent to the content distribution source of the digital content creator (step S92). The content distribution source converts the necessary portion into the analog output dedicated image format (step S93). Further, the IP key of a machine capable of analog output is added (step S94). Next, Internet distribution is conducted (step S95). The user receives the Internet distribution (step S96). Further, the user performs analog output to the image record medium (step S97). Thus, the user records the desired image data on the image record medium by the write section. The image record medium can be reused (step S98).

Figure 40:
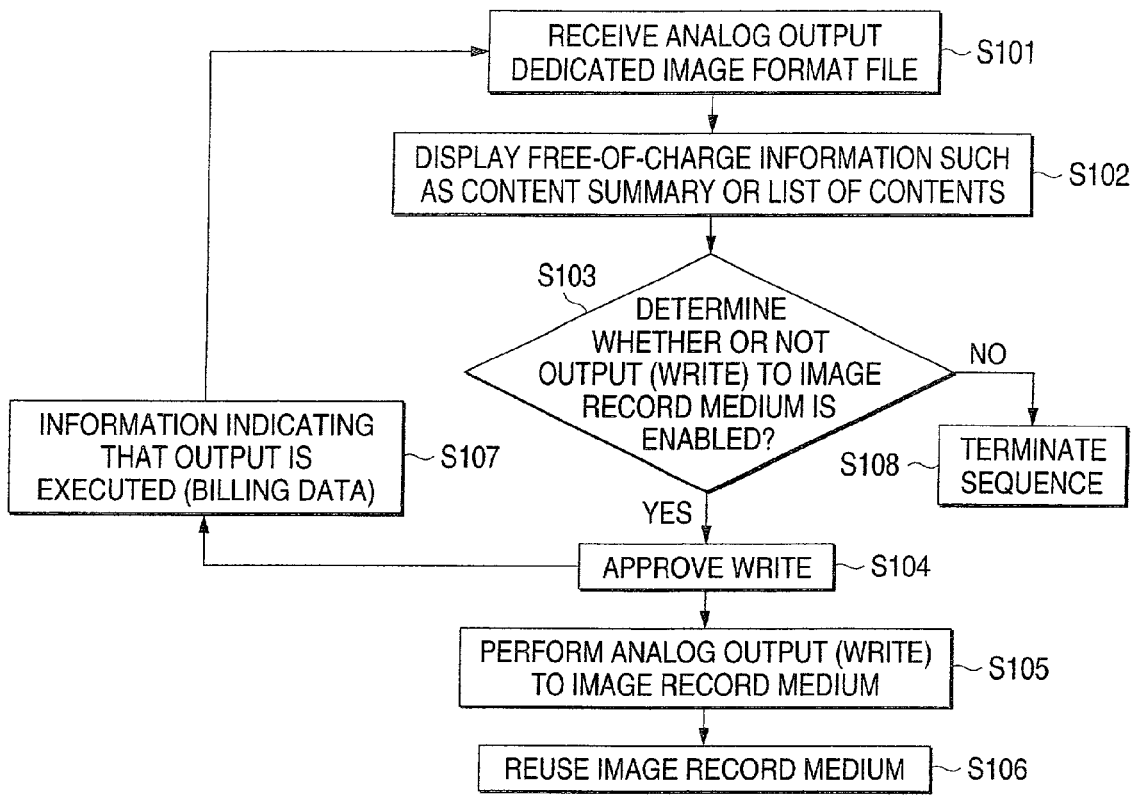
FIG. 40 is a flowchart of a program of arbitrary write onto the image record medium in the distribution system shown in FIG. 39.

FIG. 40 is a flowchart of a program of arbitrary write onto the image record medium in the distribution system shown in FIG. 39.

To begin with, at step S101, an analog output dedicated image format file is received. Next, at step S102, free-of-charge information of an outline of the contents, a table of contents, etc., is displayed at step S102. Further, at step S103, whether or not output (write) to the image record medium is enabled is determined. If it is determined that output to the image record medium is not performed, the process proceeds to step S108 and the sequence is terminated. On the other hand, if it is determined that output to the image record medium is to be performed, write is approved at step S104. At step S107, information indicating that output is executed (billing data) is recorded and the process returns to step S101. If all write is approved at step S104, analog output (write) to the image record medium is performed at step S105. The image record medium can be reused (step S106).

Figure 41:
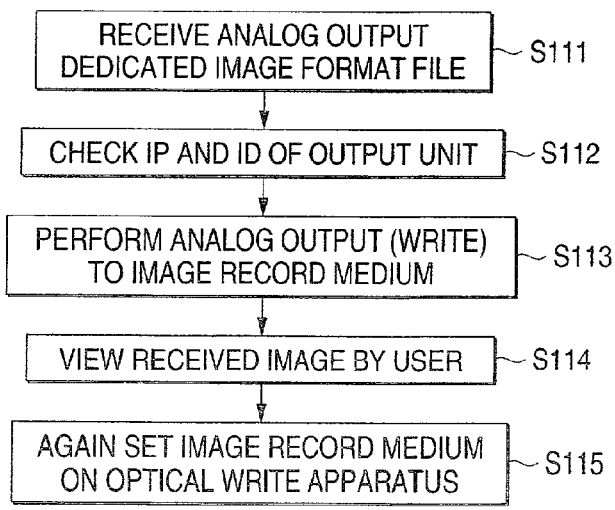
FIG. 41 is a flowchart of a program of automatic write onto the image record medium in the distribution system shown in FIG. 39.

FIG. 41 is a flowchart of a program of automatic write onto the image record medium in the distribution system shown in FIG. 39.

To begin with, at step S111, an analog output dedicated image format file is received. Next, at step S112, the IP and ID of the output unit (optical write apparatus) are checked. Further, at step S113, analog output (write) to the image record medium is performed. At step S114, the user views the received image. Further, at step S115, the image record medium is again set on the optical write apparatus. Thus, automatic write onto the image record medium is performed.

As described above, according to the invention, the demand for the optically different characteristics of light dispersion in visual observation of an image and light transmission in writing an image onto an image record medium are satisfied and the display quality of the image written onto the image record medium can be enhanced.

What is claimed is:

1. An optical write apparatus comprising:

an image display screen that displays an image, the image display screen including a dimmer layer;

a role switch section for switching the image display screen between a role in displaying an image for observation and a role in writing an image onto an image record medium onto which an image is written upon application of light representing the image by switching the dimmer layer between light dispersion mode and light transmission mode, wherein the role switch section switches the image display screen between the roles by switching the optical characteristic of the image on the image display screen into different optical characteristic, wherein the dimmer layer is switched reversibly between light dispersion mode and light transmission mode in response to a control signal, and the role switch section switches the optical characteristic of the image on the image display screen by switching the dimmer layer between the light dispersion mode and light transmission modes; and a display panel of transmission type for generating an optical pattern responsive to an image signal, wherein the dimmer layer is disposed on the front of the display panel of transmission type to form the image display screen, and wherein the display panel of transmission type is provided with a backlight for applying directional light from the rear of the display panel of transmission type.

2. An optical write apparatus comprising:

an image display screen that displays an image, the image display screen including a dimmer layer;

a role switch section for switching the image display screen between a role in displaying an image for observation and a role in writing an image onto an image record medium onto which an image is written upon application of light representing the image by switching the dimmer layer between light dispersion mode and light transmission mode, wherein the role switch section switches the image display screen between the roles by switching the optical characteristic of the image on the image display screen into different optical characteristic, wherein the dimmer layer is switched reversibly between light dispersion mode and light transmission mode in response to a control signal, and the role switch section switches the optical characteristic of the image on the image display screen by switching the dimmer layer between the light dispersion mode and light transmission modes; and a display panel of transmission type for generating an optical pattern responsive to an image signal, wherein the dimmer layer is disposed on the front of and away from the display panel of transmission type to form the image display screen, and wherein a two-dimensional lens array for forming an optical pattern on the display panel of transmission type on the dimmer layer is placed between the display panel of transmission type and the dimmer layer.

3. An optical write apparatus comprising:

an image display screen that displays an image, the image display screen including a dimmer layer; and a role switch section for switching the image display screen between a role in displaying an image for observation and a role in writing an image onto an image record medium onto which an image is written upon application of light representing the image by switching the dimmer layer between light dispersion mode and light transmission mode, wherein the role switch section switches the image display screen between the roles by switching one of a position and attitude of at least one of members forming the optical write apparatus into one of a different position and a different attitude.

4. An optical write apparatus comprising:

an image display screen that displays an image, the image display screen including a dimmer layer;

a role switch section for switching the image display screen between a role in displaying an image for observation and a role in writing an image onto an image record medium onto which an image is written upon application of light representing the image by switching the dimmer layer between light dispersion mode and light transmission mode;

an operation device; and a communication section connected to a communication line for making access responsive to operation of the operation device and for receiving an image via the communication line, wherein the image display screen is switched between the roles as the image received by the communication section is displayed on the image display screen.

5. An optical write apparatus comprising:

an image display screen that displays an image, the image display screen including a dimmer layer; and a role switch section for switching the image display screen between a role in displaying an image for observation and a role in writing an image onto an image record medium onto which an image is written upon application of light representing the image by switching the dimmer layer between light dispersion mode and light transmission mode, wherein the dimmer layer is divided into a plurality of separately controllable areas.

* * * * *